US012152761B2

(12) United States Patent
Smets et al.

(10) Patent No.: US 12,152,761 B2
(45) Date of Patent: Nov. 26, 2024

(54) METHOD FOR ASSEMBLING OPTICAL MODULES OF A LUMINAIRE AND OPTICAL ASSEMBLY

(71) Applicant: Schreder S.A., Brussels (BE)

(72) Inventors: Paul Smets, Liege (BE); Morgan Vyvey, Liege (BE)

(73) Assignee: Schreder S.A., Brussels (BE)

( * ) Notice: Subject to any disclaimer, the term of this patent is extended or adjusted under 35 U.S.C. 154(b) by 0 days.

(21) Appl. No.: 18/007,256

(22) PCT Filed: Jul. 28, 2021

(86) PCT No.: PCT/EP2021/071200
§ 371 (c)(1),
(2) Date: Jan. 27, 2023

(87) PCT Pub. No.: WO2022/023441
PCT Pub. Date: Feb. 3, 2022

(65) Prior Publication Data

US 2023/0296227 A1 Sep. 21, 2023

(30) Foreign Application Priority Data

Jul. 28, 2020 (NL) ...................................... 2026154
Jul. 28, 2020 (NL) ...................................... 2026155

(51) Int. Cl.
*F21V 19/00* (2006.01)
*F21V 5/00* (2018.01)
(Continued)

(52) U.S. Cl.
CPC .......... *F21V 19/0015* (2013.01); *F21V 5/007* (2013.01); *F21V 17/101* (2013.01); *F21Y 2115/10* (2016.08)

(58) Field of Classification Search
CPC ..... F21V 19/0015; F21V 5/007; F21V 17/101
See application file for complete search history.

(56) References Cited

U.S. PATENT DOCUMENTS 8,764,229 B2 * 7/2014 Dalsgaard ............... F21V 21/30
362/244
9,052,083 B2 6/2015 Stein
(Continued)

FOREIGN PATENT DOCUMENTS

CN 210771967 U 6/2020
EP 2871411 A1 5/2015

OTHER PUBLICATIONS

PCT International Search Report and Written Opinion, Application No. PCT/EP2021/071200, mailed Nov. 4, 2021, 15 pages.

*Primary Examiner* — Julie A Bannan
(74) *Attorney, Agent, or Firm* — McDonnell Boehnen Hulbert & Berghoff LLP

(57) ABSTRACT

Example embodiments relate to methods for assembling optical modules of a luminaire and optical assembly. One example method includes providing a frame with at least one opening. The method also includes providing a plurality of optical modules to the frame, each optical module of the plurality of optical modules being provided to an opening of the at least one opening. Additionally, the method includes providing a support means to each of the plurality of optical modules and/or to each of the at least one opening. Further, the method includes assembling the plurality of optical modules to the frame by plastically reshaping a material portion in contact with the frame and the optical module. When the optical module is assembled to the frame, a first bottom surface of the optical module is substantially at a same level as a second bottom surface of the frame.

18 Claims, 13 Drawing Sheets

(51) Int. Cl.
*F21V 17/10* (2006.01)
*F21Y 115/10* (2016.01)

(56) References Cited

U.S. PATENT DOCUMENTS

| | | | | |
|---|---|---|---|---|
| 2001/0028567 | A1 | 10/2001 | Akiyama et al. | |
| 2011/0063836 | A1 | 3/2011 | Salm | |
| 2011/0103051 | A1* | 5/2011 | Wilcox | F21V 25/12 362/267 |
| 2011/0292658 | A1* | 12/2011 | Ho | F21V 5/048 362/307 |
| 2012/0140463 | A1* | 6/2012 | Kinzer | F21V 7/043 362/231 |
| 2017/0184299 | A1 | 6/2017 | Nolan et al. | |

* cited by examiner

METHOD FOR ASSEMBLING OPTICAL MODULES OF A LUMINAIRE AND OPTICAL ASSEMBLY

CROSS-REFERENCE TO RELATED APPLICATIONS

The present application is a national stage entry of PCT/EP2021/071200 filed Jul. 28, 2021, which claims priority to NL 2026154 filed Jul. 28, 2020 and NL 2026155 filed Jul. 28, 2020, the contents of each of which are hereby incorporated by reference.

FIELD OF INVENTION

The present invention relates to methods for assembling optical modules of a luminaire and to optical assemblies for use in a luminaire, in particular an outdoor or industrial luminaire.

BACKGROUND

In existing luminaire systems it is common to design a specific printed circuit board (PCB) serving as a support for a plurality of light sources together with a specific optical plate with a plurality of optical elements (typically lens elements) for each luminaire application, e.g. a pedestrian road, a highway, etc. The design of the PCB and the optical plate depend notably on the desired light distribution on the surface to be illuminated, i.e. the desired shape of the light onto the illuminated surface. Such approach is costly, time consuming and requires extensive stock keeping. It would therefore be advantageous to be able to design a luminaire system with a more adaptive approach for which the photometry can be tailored at the factory, depending on the desired application and the desired intensity distribution.

In prior art solutions, to address the above mentioned problems, optical elements may be provided which are adjustable on an individual basis or within relatively restricted boundaries. Also, it is known to provide a luminaire system in which the position of the optical elements can be adjusted relative to the printed circuit board. However, the existing solutions are still limited in terms of flexibility, especially when it is desirable to be able to build many different large and small luminaire systems.

WO 2020/136197 A1 in the name of the applicant describes a luminaire system comprising a support structure, a plurality of light sources arranged on the support structure, and an optical structure provided with a plurality of optical elements. The plurality of optical elements may be interconnected in various ways, e.g. interlocked through dovetail connections. Such an approach has the advantage of providing a modular system.

SUMMARY

The object of embodiments of the invention is to provide a method for assembling optical modules of a luminaire and an optical assembly for use in a luminaire, allowing assembling optical modules in a modular manner according to the requirements of a desired application, preferably in a secure and flexible manner. Also, the optical assembly obtained should be able to provide an optical assembly with a securely assembled optical plate, while maintaining a high flexibility in the choice of optical elements composing the optical plate to adapt to various illumination schemes and an easy assembly.

According to a first aspect of the invention, there is provided a method for assembling optical modules according to claim 1. According to a second aspect of the invention, there is provided an optical assembly according to claim 10.

In an aspect of the invention, the method comprises the steps of providing a frame with at least one opening; providing a plurality of optical modules to the frame, each optical module of the plurality of optical modules being provided to an opening of the at least one opening; welding the plurality of optical modules to the frame.

By welding the optical modules to a frame, there is provided a fast and accurate means for fixing optical modules in the frame. The plurality of optical modules may be the same or different. The plurality of optical modules may be picked from a storage comprising many different optical modules, and this picking may be based on the desired light distribution of the luminaire in which the resulting optical assembly is to be included. Thus, the method for assembling optical modules is highly modular and allows fast and accurate manufacturing of optical assemblies. Further, by using welding, the connection can be robust and permanent.

There may be one or more optical module per opening of the frame. For example, an opening may be dimensioned to receive two optical modules one next to the other. Optionally, at least two optical modules may be assembled together using interlocking mechanical means, glue, and/or by magnetic force. Also, there may be a plurality of openings in the frame. So, the optical modules may be picked individually to custom design the optical properties of the optical assembly. Therefore, a high flexibility of the optical assembly is reached in terms of light patterning.

Preferably, the welding is any one of: ultrasonic welding, laser beam welding. Such welding techniques have the advantage of being capable of welding two plastic materials to one another. When using laser welding, typically a transparent or translucent plastic material is welded to an opaque plastic material. When using ultrasonic welding, either both materials could be transparent or translucent, or both materials could be opaque, or one material could be transparent or translucent, and the other material opaque. However, in preferred embodiments, the material of the optical module will be entirely transparent or translucent.

In preferred embodiments, ultrasonic welding may be used. Typically, ultrasonic welding will allow for a faster process. Also, compared to laser welding, ultrasonic welding has the advantage that no harmful weld fumes are generated.

According to an embodiment, for each optical module, one of the optical module or a connection portion of the frame adjacent the opening comprises a transparent portion, and the other one of the optical module and the connection portion comprises an opaque portion. The transparent portion and opaque portion are overlapped when the optical module is provided to the frame as seen in a direction substantially perpendicular to a plane of the opening. The welding comprises welding, for each optical module, the transparent portion to the opaque portion. Such embodiment is preferred for laser welding. Ultrasonic welding may use a similar structure, but could also weld two opaque portions to each other or could weld two transparent or translucent portions to each other.

Preferably, the transparent portion is included in the optical module and the opaque portion is included in the connection portion of the frame. As most optical modules are preferably at least partially transparent, it is advantageous to include the transparent portion in the optical module. Preferably, when laser welding is used, the transparent portion through which the welding beam has to pass has a thickness between 0.5 mm and 5.0 mm as seen in a direction of the laser beam, more preferably between 0.5 mm and 3 mm. The opaque portion below the transparent portion may also have a thickness between 0.5 mm and 5.0 mm as seen in a direction of the laser beam, more preferably between 0.5 mm and 3 mm. In that manner the frame can be kept relatively thin.

Preferably, the welding is ultrasonic welding, and the optical module and the frame are welded along joining surfaces, and at least one surface of the joining surfaces is provided with an energy director configured to concentrate ultrasonic energy and to initiate melting during the welding. The energy director may have e.g. a triangular cross section but any other suitable cross-sectional shape is also possible. Preferably, the height of the energy director is smaller than 0.5 mm and/or larger than 0.1 mm. Preferably, the joining surfaces form any one of the following joints: butt joints, step joints, tongue and groove joints.

When ultrasonic welding is used, preferably a welding frequency between 10 and 70 kHz, more preferably between 15 and 45 kHz, even more preferably between 20 and 30 kHz is used. This implies that the tool knocks 20.000 to 30.000 times per second, during a predetermined welding time. Preferably, the welding time is between 3 and 15 seconds, more preferably between 4 and 7 seconds.

According to another exemplary embodiment, the welding is ultrasonic welding, and the optical module and the frame are welded along joining surfaces which form shear joints.

Depending on the required quality, strength and tightness of the joints and/or on process requirements such as speed, one of the above described types of joints may be used.

In a preferred embodiment multiple optical modules are welded simultaneously to the frame using e.g. an ultrasonic welding head, multiple laser beams in parallel. For example, the welding head may operate simultaneously on one or more peripheral zones of the multiple optical modules. Also, multiple ultrasonic welding heads or laser welding heads may be used simultaneously to weld multiple subsets of optical modules simultaneously. For example, two heads may be used to weld two columns of optical modules simultaneously, wherein each column may comprise e.g. between 2 and 10 optical modules.

In another exemplary embodiment, the welding is performed by drawing straight lines and/or circular arcs with a welding beam, typically a laser welding beam. Alternatively, the welding may be done using simultaneous welding techniques where a line or arc is welded simultaneously with multiple static beams.

In an exemplary embodiment, the welding is performed by emitting a beam, e.g. a laser beam, from a side of the frame adapted for facing a support such as a PCB carrying a plurality of light sources. To that end the transparent portion through which the welding takes place may be located at that side of the frame. Alternatively the welding may be done from the opposite side.

According to an exemplary embodiment, the providing of the plurality of optical modules to the frame comprises receiving digital data representative for the optical elements to be included in the frame, and, based on the received digital data, selecting the plurality of optical modules from a storage comprising multiple different optical modules. In this manner the method may be fully or partially automated, wherein a computer means may control the selecting based on the digital data. For example, the selecting and the placing of the optical modules in the frame may be done using a robotic means controlled by the computer means. Also the welding means may be controlled by the computer means.

Preferably, the plurality of optical modules comprises a plurality of lens modules, each lens module comprising at least one lens element, preferably a single lens element.

An optical module may comprise a single optical element or multiple optical elements. If the optical module comprises multiple optical elements, those elements may be the same, e.g. two or more identical lens elements, or different, e.g. a lens element and a backlight element or two different lens elements.

More generally the plurality of optical modules may comprise any one of the following: a lens module, a reflector module, a backlight module, a prism module, a collimator module, a diffusor module, a light shielding structure, and the like. Also, an optical module may be combining multiple optical functions, e.g. a lens and a reflector function, or a collimator and a reflector function. The plurality optical modules may be the same or different. This will allow combining different optical functions in the same frame in a modular manner. For example, a first subset of light sources of a luminaire may be provided with a first set of optical modules of a first type, and a second subset of light sources may be provided with a second set of optical modules of a second type. This allows choosing suitable optical modules in function of the position of the light sources in the luminaire system. For example, light sources near the periphery of the support structure may be provided with a different optical module compared to light sources provided in the centre of the support structure, and/or light sources near the luminaire pole may be provided with a different optical module compared to light sources provided near a front end of a luminaire head of the luminaire system.

The optical modules may also comprise one or more light shielding structures complying with a certain glare classification, e.g. the G classification defined according to the CIE115:2010 standard and the G* classification defined according to the EN13201-2 standard. The light shielding structures may be configured for reducing a solid angle of light beams of the plurality of light sources by cutting off or reflecting light rays having a large incident angle, thereby reducing the light intensities at large angles and improving the G/G* classification of the luminaire system. Examples of light shielding structure are disclosed in patent applications PCT/EP2020/066221 and PCT/EP2019/074894, NL2025168 in the name of the applicant, which are included herein by reference.

Also, in order to reduce glare, a spacer element could be provided between the frame to which the optical modules are welded and a support, such as a PCB, carrying the light sources. An example of a suitable spacer is disclosed in NL2025166.

In the context of the invention, a lens element of the optical module may include any transmissive optical element that focuses or disperses light by means of refraction. It may also include any one of the following: a reflective portion, a backlight portion, a prismatic portion, a collimator portion, a diffusor portion. For example, a lens element may have a lens portion with a concave or convex surface for facing a light source, or more generally a lens portion with a flat or curved surface facing the light source, and optionally a collimator portion integrally formed with said lens portion, said collimator portion being configured for collimating light transmitted through said lens portion. Also, a lens element may be provided with a reflective portion or surface, referred to as a backlight element in the context of the invention, or with a diffusive portion.

A lens element may comprise a lens portion having an outer surface and an inner surface intended to face an associated light source. The outer surface may be a convex surface and the inner surface may be a concave or planar surface. Also, a lens element may comprise multiple lens portions adjoined in a discontinuous manner, wherein each lens portion may have a convex outer surface and a concave inner surface.

Preferably, the entire optical module, e.g. the entire lens module is made of a transparent or translucent material.

Preferably, each optical module of the plurality of optical modules has a flat bottom surface. Such flat bottom surface may be deposited on a support carrying the light sources or may be positioned at a distance of the support carrying the light sources, preferably parallel to the support carrying the light sources. Preferably, the welding comprises welding a peripheral edge portion to the frame. More in particular, the welding may comprise welding a contact surface of a peripheral edge portion of the optical module to a contact surface of the frame, wherein preferably said contact surfaces are provided substantially parallel to the flat bottom surface.

Preferably, each optical module of the plurality of optical modules is made integrally of a transparent or translucent material. Thus, the transparent or translucent portion required for the welding may be made of the same material as the rest of the optical module.

In a preferred embodiment, after welding, when the plurality of optical modules are provided to the frame, a first bottom surface of each of the plurality of optical modules is substantially at a same level as a second bottom surface of the frame, said first bottom surface and second bottom surface being adapted for being arranged on a support, such as a PCB. By aligning both bottom surfaces, the assembly can be mounted in a similar manner as the lens plates of the prior art on a support carrying the light sources. It is noted that, when using ultrasonic welding, and especially when an energy director is used, before welding, the surfaces may not be flush, and that it may be only after welding that the alignment is obtained.

However, it is noted that in other embodiments it may be interesting to arrange the optical modules such that the first bottom surfaces of the optical modules are recessed within the frame or protrude out of the frame. For example, when the optical modules are slightly recessed within the frame, the frame could function as a spacer element to reduce glare, e.g. in a similar manner as the spacer described in NL2025166. Also, it could be envisaged to use a frame which allows the optical modules to be present in different positions closer or further away from the bottom surface of the frame so that the optical element can be positioned closer or further away from a support such as a PCB carrying the light sources.

In an exemplary embodiment, each opening in the frame is delimited by a peripheral wall with at least one protruding portion configured for supporting at least one peripheral portion of the optical module. Preferably, the at least one protruding portion is shaped as a peripheral step portion, and more preferably the welding is done along the full periphery of the peripheral step portion. By welding along the full contour of the optical module, a tight fixation is obtained. In another embodiment, the at least one protruding portion comprises a peripheral wedge-shaped portion with a surface which is inclined with respect to a bottom surface of the frame, and then preferably the welding is done along the full periphery of said inclined surface.

Preferably, the at least one peripheral portion of the optical module has a shape which is substantially complementary to the shape of the at least one protruding portion. For example, the inner wall delimiting the opening may be provided with one or more steps or inclined surfaces, and the circumferential wall of the optical module may be provided with one or more complementary steps or inclined surfaces, wherein the welding takes place along one of the surfaces, preferably a surface substantially parallel to a main surface of the frame.

In an exemplary embodiment, the optical module comprises a material chosen among: poly-methyl methacrylate (PMMA), polycarbonate (PC), and the frame comprises a material chosen among: acrylonitrile butadiene styrene (ABS), polybutylene terephthalate (PBT), polycarbonate (PC), poly-methyl methacrylate (PMMA), or combinations thereof. Optionally the frame may comprise fibers such as glass fibers. More preferably, the frame is made of any one of the following materials: PBT or a mixture comprising PC and ABS.

Preferably, the at least one opening describes an array of openings with a plurality of rows and a plurality of columns. In a possible embodiment, the array is an array of at least two rows and two columns, more preferably at least three rows and at least three columns. When using laser welding, the welding may comprise welding four adjacent optical modules using a single circular motion of the laser beam and/or one or more welding steps along straight lines. When using ultrasonic welding, one or more rows or one or more columns may be welded simultaneously with a common ultrasonic welding head.

Typically, for a luminaire, an array of light sources, e.g. LEDs, is provided to a PCB. To have a correspondence between the plurality of optical modules and the plurality of light sources, it is preferable to also provide a corresponding array of a plurality of openings in the frame. Each light source of the plurality of light sources may comprise a plurality of LEDs, more particularly a multi-chip of LEDs. The light sources may be similar or may have different color temperatures. Further, each light source may be associated with one or more optical elements (e.g. a lens and/or a reflector), or a number of light sources may share one or more optical elements (e.g. one reflector and/or one lens and/or one diffusor for multiple light sources).

In a possible embodiment, the plurality of optical modules comprises four adjacent optical modules provided to four adjacent openings of the at least one opening, wherein a portion of the frame surrounded by the four adjacent openings is provided with a hole or a recess or a protrusion. A hole may be intended for receiving a fixation means such as a bolt or a screw, e.g. for fixing the frame to the luminaire. A protrusion and/or recess and/or hole may also be used for other purposes, e.g. for alignment or indication purposes or for allowing another component to be fitted on the frame. More in particular, each opening may have substantially the shape of a rectangle with cut-off corners. In that manner additional space is provided for arranging a hole or a recess or a protrusion as required. This is based on the insight that many optical modules do not need to have a functional part in the corners of the optical module.

According to another aspect of the invention, there is provided an optical assembly comprising a frame with at least one opening and a plurality of optical modules, each optical module of the plurality of optical modules being provided to an opening of the at least one opening. Each optical module is welded to the frame.

The advantages and features of the embodiments of the method apply mutatis mutandis for embodiments of the optical assembly.

Preferably, each optical module of the plurality of optical modules has a flat bottom surface.

Preferably, a peripheral edge portion of the optical module is welded to the frame. More preferably a closed peripheral edge portion is welded to the frame so that a tight structure is obtained.

In an exemplary embodiment the optical module comprises at least one lens element. Preferably the at least one lens element comprises a lens portion having an outer surface and an inner surface intended to face an associated light source, wherein the outer surface comprises a convex surface and the inner surface comprises a concave or planar surface joining the flat bottom surface.

Preferably, the optical assembly further comprises a support with a plurality of light sources, wherein the frame with the plurality of optical modules is arranged on the support so that each optical module is associated with one or more light sources of the plurality of light sources. A light source may comprise one or more light emitting diodes optionally associated with a primary optical element such as a primary lens.

According to yet another aspect there is provided a luminaire comprising an optical assembly according to any one of the embodiments disclosed above.

According to a preferred embodiment, the luminaire further comprises a driver configured to drive the plurality of light sources; and optionally a dimmer configured to control the driver to drive one or more of the plurality of light sources at a dimmed intensity. In this manner, the energy supplied to the light sources is controlled by the driver. The optional addition of a dimmer would allow obtaining a greater variety of light distributions by varying the light intensity. Preferably, the plurality of light sources is a plurality of LEDs. Moreover, the dimming level may be different from one light source to another.

According to an exemplary embodiment, the luminaire further comprises a moving means configured to perform a relative movement of the frame with the plurality of welded optical modules relative to the support carrying the optical modules. Examples of luminaire with such moving means are disclosed in patent applications WO 2019/134875 A1, WO 2020/136202 A1, WO 2020/136200 A1, WO 2020/136205 A1, WO 2020/136203 A1, WO 2020136204 A1, WO 2020/136197 A1, and WO 2020/136196 A1 in the name of the applicant, which are included herein by reference.

Exemplary embodiments of the obtained frame with welded optical modules may be included in a cover module as described in WO 2020/074229 A1, or may be an integral part of a cover module as described in WO 2020/074229 A1, which is included herein by reference. Indeed, because the optical modules may be welded in a tight manner in the frame, the frame can be part of a cover module which is intended to cooperate in a sealing manner with a mounting substrate.

Exemplary embodiments of the obtained frame with welded optical modules may have one or more optical modules with a deformable part, e.g. a deformable lens element as described in PCT application WO 2020/025427 A1 in the name of the applicant, which is included herein by reference. The frame may then be provided with a retaining and adjustment means configured to change the shape of the deformable portion whilst an edge portion of the optical module is retained in a fixed position with respect to the support carrying the one or more light sources. By changing the shape of the deformable portion, the light beam emitted through the optical modules can be changed.

Exemplary embodiments of the obtained frame with welded optical modules may be used in a lighting apparatus as disclosed in WO 2019/020366 A1 in the name of the applicant, which is included herein by reference. More in particular, the driving apparatus may be provided with a drive and control means configured to drive selectively a plurality of groups of LEDs wherein LEDs of the same group are driven simultaneously. LEDs of a same group may be associated with one or more optical modules.

Exemplary embodiments of the obtained frame with welded optical modules may be used in a luminaire assembly comprising a support carrying the one or more light sources, a protector for protecting the one or more light sources from external environmental influences, the protector having a peripheral wall comprising a transparent or translucent portion, wherein the protector is provided with a light absorbing surface arranged inside of the protector and facing the one or more light sources, such that in use part of the light emitted from the one or more light source is absorbed by the light absorbing surface to reduce upward light pollution. An example of such a luminaire assembly is disclosed in patent application NL2024425 in the name of the applicant, which is included herein by reference.

Exemplary embodiments of the obtained frame with welded optical modules may be used in a luminaire system comprising a support carrying a plurality of first light sources and a plurality of second light sources, wherein a first frame with first welded optical modules is associated with the plurality of first light sources and a second frame with second welded optical modules is associated with the plurality of second light sources. Alternatively, the first and second optical modules may be welded in the same frame. The luminaire system may then further comprise a drive and control means configured to drive and control the plurality of first light sources according to a first profile and the plurality of second light sources according to a second profile different from the first profile, wherein the first profile defines a first drive output as a function of time and the second profile defines a second drive output as a function of time. The plurality of first light sources and the first optical modules may be configured to output a first light beam having a first color temperature according to a first intensity distribution within a first solid angle, and the plurality of second light sources and the second optical modules may be configured to output a second light beam having a second color temperature according to a second intensity distribution within a second solid angle, said second intensity distribution being different from the first intensity distribution and/or said first color temperature being different from said second color temperature. Examples of similar luminaire systems are disclosed in patent application NL2024571 in the name of the applicant, which is included herein by reference.

According to another aspect of the invention there is provided a method for assembling modules for use in a luminaire. The method comprises the steps of providing a frame with at least one opening; providing a plurality of modules to the frame, each module of the plurality of modules being provided to an opening of the at least one opening; and welding the plurality of modules to the frame.

According to another aspect of the invention there is provided an assembly for use in a luminaire comprising a frame with at least one opening and a plurality of modules, each module of the plurality of modules being provided to an opening of the at least one opening. Each module is welded to the frame.

Thus, instead of using optical modules also other modules may be assembled in a frame to provide an assembly for use in a luminaire. For example, a module may comprise a non-optical element such as a sensor, e.g. a light sensor or an image sensor.

The preferred features disclosed above for optical assemblies may be included generally in any assemblies for use in a luminaire, e.g. assemblies comprising non-optical modules.

According to yet another aspect of the invention, there is provided an optical assembly. The optical assembly comprises: a frame with at least one opening; a plurality of optical modules; a support means; and a plurality of pins. At least one optical module of the plurality of optical modules is provided per opening of the at least one opening. The support means is provided to each of the plurality of optical modules and/or to each of the at least one opening, said support means being configured for supporting the optical module at least partially within the opening of the frame. The plurality of pins comprises each a portion configured for being plastically reshaped under an application of heat and/or pressure to assemble the plurality of optical modules to the frame preferably such that the plurality of optical modules are locked between the support means and the reshaped portions of the plurality of pins.

By providing the support means for supporting the optical module at least partially within the opening, on the one hand, and by providing and deforming pins, on the other hand, the optical module can be positioned and locked with respect to the frame. Indeed, the plastic reshaping may then fix in place the optical module with respect to the frame. Thus, a secure assembly of the optical modules in regards to the frame may be obtained.

The plastic reshaping typically allows reshaping a protruding portion of a pin of the plurality of pins such that said protruding portion extends over and overlaps with the optical module and/or the frame, fixing the position of one with respect to the other and complementing the support means to set the optical module three-dimensional positioning along one axis by preventing motions along the main axis of the pin. In an embodiment, one pin may be used to assemble a plurality of optical modules by overlapping, when reshaped, over at least two optical modules and/or the frame. In another embodiment, one pin may be used per optical module to assemble it to the frame. In yet another embodiment, there may be a plurality of pins, preferably two pins, used per optical module to assemble it to the frame.

In an automatized assembly performing the optical assembly, more than one pin at a time may be reshaped under the application of heat and/or pressure. Additionally, a reshaping head of the tool applying heat and/or pressure may be designed to reshape the reshapable portion of the pin following a preset form. Indeed, under the application of heat and/or pressure, the reshapable portion will complement the shape of the reshaping head applied to it. In an embodiment, the reshaping head may comprise a semi-spherical cavity and the reshapable portion will be reshaped as a semi-sphere. In another embodiment, the reshaping head may comprise an elongated cavity and the reshapable portion will be reshaped accordingly.

There may be one or more optical module per opening of the frame. For example, an opening may be dimensioned to receive two optical modules one next to the other. Optionally, at least two optical modules may be assembled together using interlocking mechanical means, glue, and/or by magnetic force. Also, there may be a plurality of openings in the frame. So, the optical modules may be picked individually to custom design the optical properties of the optical assembly. Therefore, a high flexibility of the optical assembly is reached in terms of light patterning.

The plurality of optical modules may be the same or different. The plurality of optical modules may be picked from a storage comprising many different optical modules, and this picking may be based on the desired light distribution of the luminaire in which the resulting optical assembly is to be included. Thus, a highly modular optical assembly can be manufactured in a fast and accurate manner. Further, by deforming pins, the connection can be robust and permanent.

In a preferred embodiment, the plurality of pins are oriented substantially perpendicular to a plane of the at least one opening. This will facilitate the manufacturing process.

According to an exemplary embodiment, for each opening and optical module paired, at least one recess is provided to the optical module and/or to a surface adjacent to the opening, said at least one recess being configured for receiving a portion of the pin.

In this manner, the optical modules may be supported by another structure, i.e. the frame, and the plurality of pins may be provided to the at least one recess for assembling the gathered parts of the optical assembly. The recesses may be designed such that the plurality of pins are located at an interface between the optical module and the frame in order to provide a secure assembly having a low impact on the optical properties of the optical assembly.

Preferably, there are two recesses provided for each opening and optical module paired, said two recessed being located in diametrical opposition of one with respect to the other.

According to a preferred embodiment, each optical module of the plurality of optical modules may correspond to an opening of the at least one opening.

In other words, there may be at least one optical module provided to each opening of the frame.

In this way, fewer constraints are imposed to the choices of the plurality of optical modules, and high optical assembly modularity can be obtained.

According to a preferred embodiment, the plurality of optical modules comprises a plurality of lens modules, each lens module comprising at least one lens element, preferably a single lens element.

The plurality of lens modules may form secondary lenses while corresponding light sources may already be provided with primary lenses.

Preferably, each optical module of the plurality of optical modules has a flat bottom surface. Such flat bottom surface may be deposited on a support carrying the light sources or may be positioned at a distance of the support carrying the light sources, preferably parallel to the support carrying the light sources.

An optical module may comprise a single optical element or multiple optical elements. If the optical module comprises multiple optical elements, those elements may be the same, e.g. two or more identical lens elements, or different, e.g. a lens element and a backlight element or two different lens elements.

More generally the plurality of optical modules may comprise any one of the following: a lens module, a reflector module, a backlight module, a prism module, a collimator module, a diffusor module, a light shielding structure, and the like. Also, an optical module may be combining multiple optical functions, e.g. a lens and a reflector function, or a collimator and a reflector function. The plurality of optical modules may be the same or different. This will allow combining different optical functions in the same frame in a modular manner. For example, a first subset of light sources of a luminaire may be provided with a first set of optical modules of a first type, and a second subset of light sources may be provided with a second set of optical modules of a second type. This allows choosing suitable optical modules in function of the position of the light sources in the luminaire system. For example, light sources near the periphery of the support structure may be provided with a different optical module compared to light sources provided in the centre of the support structure, and/or light sources near the luminaire pole may be provided with a different optical module compared to light sources provided near a front end of a luminaire head of the luminaire system.

The optical modules may also comprise one or more light shielding structures complying with a certain glare classification, e.g. the G classification defined according to the CIE115:2010 standard and the G* classification defined according to the EN13201-2 standard. The light shielding structures may be configured for reducing a solid angle of light beams of the plurality of light sources by cutting off or reflecting light rays having a large incident angle, thereby reducing the light intensities at large angles and improving the G/G* classification of the luminaire system. Exemplary embodiments of shielding structures are disclosed in patent application PCT/EP2020/066221 in the name of the applicant which is included herein by reference. Other exemplary embodiments of shielding structures are disclosed in patent applications PCT/EP2019/074894, and NL2025168 in the name of the applicant which are included herein by reference.

Also, in order to reduce glare, a spacer element could be provided between the frame to which the optical modules are welded and a support, such as a PCB, carrying the light sources. An example of a suitable spacer is disclosed in NL2025166.

In the context of the invention, a lens element of the optical module may include any transmissive optical element that focuses or disperses light by means of refraction. It may also include any one of the following: a reflective portion, a backlight portion, a prismatic portion, a collimator portion, a diffusor portion. For example, the lens element may have a lens portion with a concave or convex surface for facing a light source, or more generally a lens portion with a flat or curved surface facing the light source, and optionally a collimator portion integrally formed with said lens portion, said collimator portion being configured for collimating light transmitted through said lens portion. Also, a lens element may be provided with a reflective portion or surface, referred to as a backlight element in the context of the invention, or with a diffusive portion.

A lens element may comprise a lens portion having an outer surface and an inner surface intended to face an associated light source. The outer surface may be a convex surface and the inner surface may be a concave or planar surface. Also, the lens element may comprise multiple lens portions adjoined in a discontinuous manner, wherein each lens portion may have a convex outer surface and a concave inner surface.

Preferably, the entire optical module, e.g. the entire lens module is made of a transparent or translucent material.

According to an exemplary embodiment, the pin is integrally formed with the frame or with the optical module, preferably integrally formed with the frame.

In this manner, the structural integrity of the optical module or of the frame with the plurality of pins is improved and the overall assembly strength of the optical assembly is increased.

In an embodiment, the reshapable portion of the pin is protruding from a surrounding surface of the optical module or of the frame. The protruding portion of the pin may be sized in height and width such that there is an amount of material sufficient to ensure a safe fixation after reshaping. In another embodiment, the pin is separately formed from the frame and from the optical module paired.

Preferably, the pin may be integrally formed with the frame which makes it easier to assemble the optical module to the frame, said optical module being provided from an upward direction, and which makes it easier to reshape the pin from the upward direction as well.

According to a preferred embodiment, the support means is integrally formed with the frame and/or with the optical module, preferably integrally formed with the frame.

In this manner, the structural integrity of the optical module or of the frame with the support means is improved and the overall assembly strength of the optical assembly is increased.

Generally, the support means comprises a supporting portion on one of the frame or the optical module, and a bearing portion on the other one of the frame or the optical module. The supporting portion and the bearing portion may be overlapping as seen in a direction perpendicular to a plane of the opening.

Preferably, the support means comprises at least one tab extending substantially parallel to a plane of the openings of the frame. Even more preferably, the at least on tab extends inwardly inside the openings. Additionally, the at least one tab may be configured for being provided to at least one complementary indent formed in the optical module. More preferably, the at least one tab may be a plurality of tabs located oppositely with respect to each other. In another example, the at least one tab may be one tab extending along the entire periphery of the opening.

Preferably, the support means is integrally formed with the frame to ease the logistics from the viewpoint of optical modules stock-keeping. Indeed, when designing the optical assembly, the task may be made easier if the optical modules have predefined footprints and only the frame has to be custom-designed with the support means provided at given points of the frame.

According to an exemplary embodiment, the frame is made of a translucent or transparent material.

In this way, the optical properties of the optical assembly may be less affected by having a heterogeneous structure.

According to a preferred embodiment, the pin is made of a material chosen among polybutylene terephthalate (PBT), acrylonitrile butadiene styrene (ABS), poly-methyl methacrylate (PMMA), polycarbonate (PC), or a combination thereof; and the frame is made of a material chosen among PBT, ABS, PMMA, PC, or a combination thereof. In a preferred embodiment the frame may be made of polybutylene terephthalate (PBT) or a mixture of polycarbonate (PC) and acrylonitrile butadiene styrene (ABS).

According to an exemplary embodiment, the at least one opening describes an array of openings with a plurality of rows and a plurality of columns.

Typically, for a luminaire, a plurality of LEDs is provided to a PCB in an array. To have a correspondence between the optical modules and the plurality of LEDs, it is preferable to also provide the at least one opening of the frame in an array. Also, doing so may allow a more accurate prediction of the optical properties of the optical assembly when making a custom design optical assembly than when having the at least one opening located randomly.

In a possible embodiment, the plurality of optical modules comprises four adjacent optical modules provided to four adjacent openings of the at least one opening, wherein a portion of the frame surrounded by the four adjacent openings is provided with a hole or a recess or a protrusion. A hole may be intended for receiving a fixation means such as a bolt or a screw, e.g. for fixing the frame to the luminaire. A protrusion and/or recess and/or hole may also be used for other purposes, e.g. for alignment or indication purposes or for allowing another component to be fitted on the frame. More in particular, each opening may have substantially the shape of a rectangle with cut-off corners. In that manner additional space is provided for arranging a hole or a recess or a protrusion as required. This is based on the insight that many optical modules do not need functional part in the corners of the optical module.

According to a preferred embodiment, the pin, when the optical module is assembled to the frame, is located at substantially 90° with respect to the support means as seen in the plane of the opening.

In this manner, the plurality of pins and the support means provide a substantially balanced maintaining action of the optical module respective to the frame. In an embodiment, there may be two pins per optical module and two tabs per optical module. The two pins may be located in diametrical opposition, the two tabs may be located in diametrical opposition, and the two pins may be located at substantially 90° respective to the two tabs.

In an alternative embodiment, the plurality of pins may be located oppositely with respect to each other and the support means comprises a peripheral tab per opening. In yet another embodiment, the support means may comprise more than two tabs.

According to an exemplary embodiment, the reshapable portion of the pin is protruding outwardly, e.g. in an upward direction when the frame is on its bottom surface intended to face the light sources, when the optical module is provided to the opening.

By upward direction, it is meant a direction opposite to a plurality of light sources when the optical module is assembled to the frame. Additionally, when providing the optical module to the opening, the optical module may be preferably coming from the upward direction.

In this way, no unneeded protrusion is present on a side of the optical assembly facing the light sources which could perturb light rays travel, or which could obstruct a fixation of the optical assembly on a support of the light sources.

According to a preferred embodiment, when the optical module is assembled to the frame, a first bottom surface of the optical module is substantially at a same level as a second bottom surface of the frame, said first bottom surfaces and second bottom surface being adapted for facing a support, such as a PCB, carrying a plurality of light sources.

In this manner, one can obtain an optical assembly with a flush bottom side which allows for an accurate placement of the optical assembly over light sources. Indeed, the first bottom surface and the second bottom surface may be adapted for being arranged on a support, such as a PCB. By aligning both bottom surfaces, the assembly can be mounted in a similar manner as the lens plates of the prior art on a support carrying the light sources.

However, it is noted that in other embodiments it may be interesting to arrange the optical modules such that the first bottom surfaces of the optical modules are recessed within the frame or protrude out of the frame. For example, when the optical modules are slightly recessed within the frame, the frame could function as a spacer element to reduce glare, e.g. in a similar manner as the spacer described in NL2025166. Also, it could be envisaged to use a frame which allows the optical modules to be present in different positions closer or further away from the bottom surface of the frame so that the optical element can be positioned closer or further away from a support such as a PCB carrying the light sources.

According to an exemplary embodiment, a peripheral surface of the at least one recess is configured as the support means for supporting the corresponding optical module at least partially within the opening of the frame.

In this way, the material forming the at least one recess may have a double usage as a part of the support means as well.

According to a preferred embodiment, the at least one recess is provided to a side surface of the optical module.

In an alternative embodiment, the at least one recess may be provided to a side surface delimiting the opening.

When the recess is provided to a side surface delimiting the opening, the pin corresponding to the at least one recess may be integrally formed with the optical module and may be provided to a side of the optical module, preferably along its thickness. Alternatively, when the recess is provided to a side surface of the optical module, the pin corresponding to the at least one recess may be integrally formed with the frame and may be provided to a side surface delimiting the opening.

By this approach, the at least one recess may be formed as a U-shaped indent along the thickness of the opening, instead of a through-hole for example. No extra material is wasted to form the at least one recess.

According to an exemplary embodiment, a diameter of the pin is larger than 1 mm and smaller than 7 mm before the application of heat and/or pressure.

In this way, the pin comprises a sufficient amount of material to be reshaped such that, after reshaping, the pin can maintain the optical module fixed to the frame.

The advantages and features of the embodiments of the above described optical assembly apply mutatis mutandis for embodiments of the below presented lighting system.

According to yet another aspect of the invention, there is provided a lighting system. The lighting system comprises: a plurality of light sources, preferably a plurality of LED light sources, provided to a substrate; an optical plate comprising a plurality of optical elements, each optical element of the plurality of optical elements corresponding to a light source of the plurality of light sources. The optical plate is formed with an optical assembly according to any one of the embodiments described above.

The plurality of light sources may comprise a plurality of LEDs. Further, each light source of the plurality of light sources may comprise a plurality of LEDs, more particularly a multi-chip of LEDs; said light sources may be similar or may have different colours or different colour temperatures. Further, each light source may be associated with one or more optical elements (e.g. a lens and/or a reflector), or a number of light sources may share one or more optical elements (e.g. one reflector and/or one lens and/or one diffusor for multiple light sources).

The plurality of optical elements may comprise one or more lens elements as defined above.

The optical plate may comprise a frame with at least one opening as defined above. There may be one or more optical modules per opening of the frame, and each optical module may comprise one or more optical elements.

Preferably, the lighting system is an outdoor or industrial lighting system. By outdoor or industrial lighting system, it is meant lighting systems which are installed on roads, tunnels, industrial plants, stadiums, airports, harbors, rail stations, campuses, parks, cycle paths, pedestrian paths or in pedestrian zones, for example, and which can be used notably for the lighting of an outdoor area or large indoor area, such as roads and residential areas in the public domain, private parking areas and access roads to private building infrastructures, warehouses, industry halls, etc.

According to an exemplary embodiment, the lighting system further comprises a moving means. The optical plate is movable with respect to the substrate, and the moving means is configured to move the optical plate relative to the substrate, preferably in a movement plane substantially parallel to the substrate.

Examples of luminaire with such moving means are disclosed in patent applications WO 2019/134875 A1, WO 2020/136202 A1, WO 2020/136200 A1, WO 2020/136205 A1, WO 2020/136203 A1, WO 2020136204 A1, WO 2020/136197 A1, and WO 2020/136196 A1 in the name of the applicant, which are included herein by reference.

For example, the substrate provided with the plurality of light sources may be fixed in the luminaire system, and the optical plate comprising the plurality of optical elements moves relative to the substrate. This arrangement allows heat dissipation of the substrate via thermal contact with a heat dissipative surface part of the luminaire system.

The movement of the optical plate relative to the substrate in the movement plane may be a translational movement along one translational axis in a plane parallel to the surface of the substrate or may be a more complex movement, e.g. zig-zag, S-shaped, curved, along an acute angle, simultaneously with a rotational movement.

In another exemplary embodiment, there may be a first and a second moving means configured for movements as described above, said first moving means being configured to move the optical plate relative to the substrate along a first trajectory in the movement plane substantially parallel to the substrate, and said second moving means being configured to move, independently from the first moving means, the optical plate relative to the substrate along a second trajectory in the movement plane substantially parallel to the substrate.

In yet another exemplary embodiment, in addition to the moving means, the luminaire system may comprise an elevating means configured to change the elevation of the optical plate relative to the substrate. A plurality of spring elements may be arranged between the substrate and the optical plate to maintain the optical plate substantially parallel to the substrate.

Exemplary embodiments of the obtained frame with assembled optical modules may be included in a cover module as described in WO 2020/074229 A1, or may be an integral part of a cover module as described in WO 2020/074229 A1, which is included herein by reference. Indeed, because the optical modules may be assembled in a tight manner in the frame, the frame can be part of a cover module which is intended to cooperate in a sealing manner with a mounting substrate.

Exemplary embodiments of the obtained frame with assembled optical modules may have one or more optical modules with a deformable part, e.g. a deformable lens element as described in PCT application WO 2020/025427 A1 in the name of the applicant, which is included herein by reference. The frame may then be provided with a retaining and adjustment means configured to change the shape of the deformable portion whilst an edge portion of the optical module is retained in a fixed position with respect to the support carrying the one or more light sources. By changing the shape of the deformable portion, the light beam emitted through the optical modules can be changed.

Exemplary embodiments of the obtained frame with assembled optical modules may be used in a lighting apparatus as disclosed in WO 2019/020366 A1 in the name of the applicant, which is included herein by reference. More in particular, the driving apparatus may be provided with a drive and control means configured to drive selectively a plurality of groups of LEDs wherein LEDs of the same group are driven simultaneously. LEDs of a same group may be associated with one or more optical modules.

Exemplary embodiments of the obtained frame with assembled optical modules may be used in a luminaire assembly comprising a support carrying the light source, a protector for protecting the light source from external environmental influences, the protector having a peripheral wall comprising a transparent or translucent portion, wherein the protector is provided with a light absorbing surface arranged inside of the protector and facing the light source, such that in use part of the light emitted from the light source is absorbed by the light absorbing surface to reduce upward light pollution. An example of such a luminaire assembly is disclosed in patent application NL2024425 in the name of the applicant, which is included herein by reference.

Exemplary embodiments of the obtained frame with assembled optical modules may be used in a luminaire system comprising a support carrying a plurality of first light sources and a plurality of second light sources, wherein a first frame with first assembled optical modules is associated with the plurality of first light sources and a second frame with second assembled optical modules is associated with the plurality of second light sources. Alternatively, the first and second optical modules may be assembled in the same frame. The luminaire system may then further comprise a drive and control means configured to drive and control the plurality of first light sources according to a first profile and the plurality of second light sources according to a second profile different from the first profile, wherein the first profile defines a first drive output as a function of time and the second profile defines a second drive output as a function of time. The plurality of first light sources and the first optical modules may be configured to output a first light beam having a first color temperature according to a first intensity distribution within a first solid angle, and the plurality of second light sources and the second optical modules may be configured to output a second light beam having a second color temperature according to a second intensity distribution within a second solid angle, said second intensity distribution being different from the first intensity distribution and/or said first color temperature being different from said second color temperature. Examples of similar luminaire systems are disclosed in patent application NL2024571 in the name of the applicant, which is included herein by reference.

The advantages and features of the embodiments of the above described optical assembly and lighting system apply mutatis mutandis for embodiments of the below presented assembly method, preferably an automatized assembly method.

According to still another aspect of the invention, there is provided an assembly method for assembling optical modules. The method comprises the steps of:

providing a frame with at least one opening;

providing a plurality of optical modules, wherein at least one optical module of the plurality of optical modules is provided per opening of the at least one opening;

providing a support means to each of the plurality of optical modules and/or to each of the at least one opening, said support means being configured for supporting the optical module at least partially within the opening of the frame;

assembling the plurality of optical modules to the frame by plastically reshaping a plurality of pins, each pin of the plurality of pins comprising a portion configured for being plastically reshaped under an application of heat and/or pressure such that the plurality of optical modules are locked between the support means and the reshaped portions of the plurality of pins.

By using a plurality of pins, there is provided a fast and accurate means for assembling optical modules in the frame. The plurality of optical modules may be the same or different. The plurality of optical modules may be picked from a storage comprising many different optical modules, and this picking may be based on the desired light distribution of the luminaire in which the resulting optical assembly is to be included. Thus, the method for assembling optical modules is highly modular and allows fast and accurate manufacturing of optical assemblies. Further, by using reshaped pins, the connection can be robust and permanent.

According to a preferred embodiment, when assembling the plurality of optical modules to the frame, at least two pins of the plurality of pins are plastically reshaped simultaneously.

According to an exemplary embodiment, when assembling the plurality of optical modules to the frame, a pin of the plurality of pins is plastically reshaped over at least two of the plurality of optical modules.

According to a preferred embodiment, each pin of the plurality of pins is provided at a periphery of an optical module of the plurality of optical modules.

To reshape the plurality of pins, a tool with a heated head may be applied on each reshapable portion. The shape of the heated head may define the reshaped form of the pin. Indeed, under the application of heat and/or pressure, the reshapable portion will complement the shape of the reshaping head applied to it. In an embodiment, the reshaping head may comprise a semi-spherical cavity and the reshapable portion will be reshaped as a semi-sphere. In another embodiment, the reshaping head may comprise an elongated cavity and the reshapable portion will be reshaped accordingly. For example, the elongated reshaped portion may overlap at least two adjacent optical modules; thereby decreasing the number of pins required for the assembly.

Preferably, the reshaped form of the pin extends along and/or across the periphery of the optical module. Also, each of the plurality of pins may be provided to a periphery of the corresponding optical module; thereby decreasing an impact of the pins on the optical properties of the optical modules.

During assembly, the heated head may be configured to apply heat at a temperature above the glass transition temperature of the reshapable portion. More than one reshapable portion may be reshaped at once by the tool to increase assembly speed. For example, the tool may reshape at once two adjacent pins simultaneously. In an embodiment, the tool may be configured for reshaping five pairs of adjacent pins organized in one column at once.

According to an exemplary embodiment, the providing of the plurality of optical modules comprises the steps of:

receiving digital data representative for the optical modules to be included in the frame, and based on the received digital data, selecting the plurality of optical modules from a storage comprising multiple different optical modules.

In this manner the method may be fully or partially automated, wherein a computer means may control the selecting based on the digital data. For example, the selecting and the placing of the optical modules in the frame may be done using a robotic means controlled by the computer means.

The advantages and features of the embodiments of the above described optical assembly, lighting system, and assembly method apply mutatis mutandis for embodiments of the below presented luminaire.

According to another aspect of the invention, there is provided a luminaire. The luminaire comprises an optical assembly according to any one of the above described optical assembly embodiments.

According to another aspect of the invention there is provided an assembly for use in a luminaire, said assembly comprising: a frame with at least one opening, preferably a plurality of openings; a plurality of modules, wherein at least one module of the plurality of modules is provided per opening of the at least one opening; a support means provided to each of the plurality of modules and/or to each of the at least one opening, said support means being configured for supporting the module at least partially within the opening of the frame; a plurality of pins comprising a portion configured for being plastically reshaped under an application of heat and/or pressure to assemble the plurality of modules to the frame such that the plurality of modules are locked between the support means and the reshaped portions of the plurality of pins.

Thus, instead of using optical modules also other modules may be assembled in a frame to provide an assembly for use in a luminaire. For example, a module may comprise a non-optical element such as a sensor, e.g. a light sensor or an image sensor.

The preferred features disclosed above for optical assemblies may be included generally in any assemblies for use in a luminaire, e.g. assemblies comprising non-optical modules.

Preferably, the luminaire is an outdoor or industrial luminaire. By outdoor or industrial luminaires, it is meant luminaires which are installed on roads, tunnels, industrial plants, stadiums, airports, harbors, rail stations, campuses, parks, cycle paths, pedestrian paths or in pedestrian zones, for example, and which can be used notably for the lighting of an outdoor area or a large indoor area, such as roads and residential areas in the public domain, private parking areas and access roads to private building infrastructures, warehouses, industry halls, etc.

According to further aspects of the invention, there are provided an optical assembly, a lighting system, a assembly method, and a luminaire as above described. These aspects of the invention are defined by the following set of clauses.

1. An optical assembly, said assembly comprising:

a frame with at least one opening, preferably a plurality of openings;

a plurality of optical modules, wherein at least one optical module of the plurality of optical modules is provided per opening of the at least one opening;

a support means provided to each of the plurality of optical modules and/or to each of the at least one opening, said support means being configured for supporting the optical module at least partially within the opening of the frame;

a plurality of pins comprising a portion configured for being plastically reshaped under an application of heat and/or pressure to assemble the plurality of optical modules (20) to the frame such that the plurality of optical modules are locked between the support means and the reshaped portions of the plurality of pins.

2. The optical assembly according to clause 1, wherein the pin is integrally formed with the frame or with the optical module, preferably integrally formed with the frame.

3. The optical assembly according to clause 1 or 2, wherein, for each opening and optical module paired, at least one recess is provided to the optical module and/or to a surface adjacent to the opening, said at least one recess being configured for receiving a portion of the pin.

4. The optical assembly according to any one of the previous clauses, wherein each optical module of the plurality of optical modules corresponds to an opening of the at least one opening.

5. The optical assembly according to any one of the previous clauses, wherein the plurality of optical modules comprises a plurality of lens modules.

6. The optical assembly according to any one of the previous clauses, wherein the support means is integrally formed with the frame and/or with the optical module, preferably integrally formed with the frame.

7. The optical assembly according to any one of the previous clauses, wherein the support means comprises at least one tab extending substantially parallel to a plane of the at least one opening of the frame.

8. The optical assembly according to the previous clause, wherein the at least one tab extends inwardly inside the at least one opening.

9. The optical assembly according to any one of the previous clauses, wherein the frame is made of a translucent or transparent material.

10. The optical assembly according to any one of the previous clauses, wherein the pin is made of a material chosen among acrylonitrile butadiene styrene (ABS), polybutylene terephthalate (PBT), poly-methyl methacrylate (PMMA), polycarbonate (PC), or a combination thereof; and wherein the frame is made of a material chosen among acrylonitrile butadiene styrene (ABS), polybutylene terephthalate (PBT), poly-methyl methacrylate (PMMA), polycarbonate (PC), or a combination thereof.

11. The optical assembly according to any one of the previous clauses, wherein the at least one opening describes an array with a plurality of rows and a plurality of columns.

12. The optical assembly according to the previous clause, wherein the plurality of optical modules comprises four adjacent optical modules provided to four adjacent openings of the at least one opening, wherein a portion of the frame surrounded by the four adjacent openings is provided with a hole or a recess or a protrusion.

13. The optical assembly according to any one of the previous clauses, wherein the pin, when the optical module is assembled to the frame, is located at substantially 90° with respect to the support means as seen in the plane of the opening.

14. The optical assembly according to any one of the previous clauses, wherein the reshapable portion of the pin is protruding outwardly when the optical module is provided to the opening, preferably in an upward direction when the frame is positioned on a bottom surface intended to face a support carrying light sources.

15. The optical assembly according to any one of the previous clauses, wherein, when the optical module is assembled to the frame, a first bottom surface of the optical module is substantially at a same level as a second bottom surface of the frame, said first bottom surfaces and second bottom surface being adapted for facing a plurality of light sources.

16. The optical assembly according to clause 3, optionally in combination with any one of clauses 4-15, wherein a peripheral surface of the at least one recess is configured as the support means for supporting the corresponding optical module at least partially within the opening of the frame.

17. The optical assembly according to clause 3, optionally in combination with any one of clauses 4-16, wherein the at least one recess is provided to a side surface of the optical module.

18. The optical assembly according to any one of the previous clauses, wherein a diameter of the pin is larger than 1 mm and smaller than 7 mm before the application of heat and/or pressure.

19. A lighting system comprising:

a plurality of light sources, preferably a plurality of LED light sources, provided to a substrate;

an optical plate comprising a plurality of optical elements, each optical element of the plurality of optical elements corresponding to a light source of the plurality of light sources;

wherein the optical plate is formed with an optical assembly according to any one of the previous clauses.

20. The lighting system according to the previous clause, further comprising a moving means; wherein the optical plate is movable with respect to the substrate; and wherein the moving means is configured to move the optical plate relative to the substrate, preferably in a movement plane substantially parallel to the substrate.

21. An assembly method for assembling optical modules, said method comprising the steps of:

providing a frame with at least one opening, preferably a plurality of openings;

providing a plurality of optical modules, wherein at least one optical module of the plurality of optical modules is provided per opening of the at least one opening;

providing a support means to each of the plurality of optical modules and/or to each of the at least one opening, said support means being configured for supporting the optical module at least partially within the opening of the frame;

assembling the plurality of optical modules to the frame by plastically reshaping a plurality of pins, each pin of the plurality of pins comprising a portion configured for being plastically reshaped under an application of heat and/or pressure such that the plurality of optical modules are locked between the support means and the reshaped portions of the plurality of pins.

22. The assembly method according to the previous clause, wherein, when assembling the plurality of optical modules to the frame, at least two pins of the plurality of pins are plastically reshaped simultaneously.

23. The assembly method according to clause 21 or 22, wherein, when assembling the plurality of optical modules to the frame, a pin of the plurality of pins is plastically reshaped over at least two of the plurality of optical modules.
24. The assembly method according to any one of clauses 21-23, wherein each pin of the plurality of pins is provided in periphery to an optical module of the plurality of optical modules.
25. The method according to any one of clauses 21-24, wherein the providing of the plurality of optical modules comprises the steps of:
    receiving digital data representative for the optical modules to be included in the frame, and
    based on the received digital data, selecting the plurality of optical modules from a storage comprising multiple different optical modules.
26. Luminaire comprising an optical assembly according to any one of the clauses 1-18.

According to yet further aspects of the invention, there are provided a method for assembling optical modules, an optical assembly, and a luminaire as above described. These aspects of the invention are defined by the following set of clauses.

1. A method for assembling optical modules, said method comprising the steps of:
    providing a frame with at least one opening;
    providing a plurality of optical modules to the frame, each optical module of the plurality of optical modules being provided to an opening of the at least one opening;
    welding the plurality of optical modules to the frame.
2. The method according to clause 1, wherein the welding is any one of: ultrasonic welding, laser beam welding.
3. The method according to any one of the previous clauses, wherein the providing of the plurality of optical modules to the frame comprises the step of receiving digital data representative for the optical modules to be included in the frame, and the step of, based on the received digital data, selecting the plurality of optical modules from a storage comprising multiple different optical modules.
4. The method according to any one of the previous clauses, wherein the plurality of optical modules comprises a plurality of lens modules, each lens module comprising at least one lens element, preferably a single lens element.
5. The method according to any one of the previous clauses, wherein each optical module of the plurality of optical modules has a flat bottom surface, and wherein the welding comprises welding a contact surface of a peripheral edge portion of the optical module to a contact surface of the frame, wherein preferably said contact surfaces are provided substantially parallel to the flat bottom surface.
6. The method according to any one of the previous clauses, wherein each optical module of the plurality of optical modules is made integrally of a transparent or translucent material.
7. The method according to any one of the previous clauses, wherein, after welding, when the plurality of optical modules are provided to the frame, a first bottom surface of each of the plurality of optical modules is substantially at a same level as a second bottom surface of the frame, said first bottom surface and second bottom surface being adapted for being arranged on a support, such as a PCB.
8. The method according to any one of the previous clauses, wherein each opening in the frame is delimited by a peripheral wall with at least one protruding portion configured for supporting at least one peripheral portion of the optical module.
9. The method according to the previous clause, wherein the at least one protruding portion is shaped as a peripheral step portion, and wherein preferably the welding is done along the full periphery of the peripheral step portion.
10. The method according to clause 8, wherein the at least one protruding portion comprises a peripheral wedge-shaped portion with a surface which is inclined with respect to a bottom surface of the frame, and wherein preferably the welding is done along the full periphery of said inclined surface.
11. The method according to any one of the clauses 8-10, wherein the at least one peripheral portion of the optical module has a shape which is substantially complementary to the shape of the at least one protruding portion.
12. The method according to any one of the previous clauses, wherein the welding is ultrasonic welding, and wherein the optical module and the frame are welded along joining surfaces, and wherein at least one surface of the joining surfaces is provided with an energy director configured to concentrate ultrasonic energy and to initiate melting during the welding.
13. The method of the previous clause, wherein the joining surfaces form any one of the following joints: butt joints, step joints, tongue and groove joints.
14. The method according to any one of the clauses 1-11, wherein the welding is ultrasonic welding, and wherein the optical module and the frame are welded along joining surfaces which form shear joints.
15. The method according to any one of the previous clauses, wherein the optical module is made of a material chosen among: poly-methyl methacrylate (PMMA), polycarbonate (PC), or combinations thereof.
16. The method according to any one of the previous clauses, wherein the frame is made of a material chosen among: polybutylene terephthalate (PBT), acrylonitrile butadiene styrene (ABS), polycarbonate (PC), poly-methyl methacrylate (PMMA), or a combination thereof; wherein the frame optionally comprises reinforcing fibers such as glass fibers.
17. The method according to any one of the previous clauses, wherein the welding is done by laser beam welding, and wherein, for each optical module, one of the optical module or a connection portion of the frame adjacent the opening comprises a transparent portion, and the other one of the optical module and the connection portion comprises an opaque portion, said transparent portion and opaque portion being overlapped when the optical module is provided to the frame as seen in a direction substantially perpendicular to a plane of the opening; wherein the welding comprises using a beam (B) to weld, for each optical module, the transparent portion to the opaque portion.
18. The method according to the previous clause, wherein the transparent portion is included in the optical module and the opaque portion is included in the connection portion of the frame.

19. The method according to any one of the previous clauses, wherein multiple optical modules are welded simultaneously, preferably using a single ultrasonic welding tool.
20. The method according to any one of the previous clauses, wherein the at least one opening describes an array with a plurality of rows and a plurality of columns.
21. The method according to the previous clause, wherein the array is an array of at least two rows and two columns, and wherein the welding comprises welding four adjacent optical modules using a single circular motion (C) of the laser beam.
22. The method according to any one of the previous clauses, wherein the plurality of optical modules comprises four adjacent optical modules provided to four adjacent openings of the at least one opening, wherein a portion of the frame surrounded by the four adjacent openings is provided with a hole or a recess or a protrusion.
23. The method according to any one of the previous clauses, wherein each opening (110) has substantially the shape of a rectangle with cut-off corners.
24. The method according to any one of the previous clauses, further comprising the step of mounting the frame with the welded optical modules on a support carrying a plurality of light sources such that each optical module is associated with one or more light sources of the plurality of light sources, wherein preferably each light source comprises one or more light emitting diodes with an optional primary optical element, e.g. a primary lens.
25. An optical assembly comprising:
    a frame with at least one opening;
    a plurality of optical modules, each optical module of the plurality of optical modules being provided to an opening of the at least one opening;
    wherein each optical module is welded to the frame.
26. The optical assembly according to the previous clause, wherein the plurality of optical modules comprises a plurality of lens element modules, each lens element module comprising at least one lens element, preferably a single lens element.
27. The optical assembly according to any one of the clauses 25-26, wherein each optical module of the plurality of optical modules has a flat bottom surface, and wherein a peripheral edge portion of the optical module is welded to the frame.
28. The optical assembly according to clause 26 and 27, wherein the at least one lens element comprises a lens portion having an outer surface and an inner surface intended to face an associated light source, wherein the outer surface comprises a convex surface and the inner surface comprises a concave or a planar surface joining the flat bottom surface.
29. The optical assembly according to any one of the clauses 25-28, wherein each optical module of the plurality of optical modules is made integrally of a transparent or translucent material.
30. The optical assembly according to any one of the clauses 25-29, wherein a first bottom surface of each of the plurality of optical modules is substantially at a same level as a second bottom surface of the frame, said first bottom surface and second bottom surface being adapted for being arranged on a support, such as a PCB.
31. The optical assembly according to any one of the clauses 25-30, wherein each opening in the frame is delimited by a peripheral wall with at least one protruding portion configured for supporting at least one peripheral portion of the optical module.
32. The optical assembly according to the previous clause, wherein the at least one protruding portion is shaped as a peripheral step portion, and wherein preferably the full periphery of the peripheral step portion is welded to the optical module.
33. The optical assembly according to any one of the clauses 31-32, wherein the at least one peripheral portion of the optical module has a shape which is substantially complementary to the shape of the at least one protruding portion.
34. The optical assembly according to any one of the clauses 25-33, wherein the optical module is made of a material comprising any one of the following or a combination thereof: poly-methyl methacrylate (PMMA), polycarbonate (PC), and wherein the frame is made of a material comprising any one of the following or a combination thereof: acrylonitrile butadiene styrene (ABS), polybutylene terephthalate (PBT), polycarbonate (PC), poly-methyl methacrylate (PMMA).
35. The optical assembly according to any one of the clauses 25-34, wherein the at least one opening describes an array with a plurality of rows and a plurality of columns.
36. The optical assembly according to any one of the clauses 25-35, wherein the plurality of optical modules comprises four adjacent optical modules provided to four adjacent openings of the at least one opening, wherein a portion of the frame surrounded by the four adjacent openings is provided with a hole or a recess or a protrusion.
37. The optical assembly according to any one of the clauses 25-36, wherein each opening has substantially the shape of a rectangle with cut-off corners.
38. The optical assembly according to any one of the clauses 25-37, wherein the plurality of optical modules comprises at least two different optical modules.
39. The optical assembly according to any one of the clauses 20-35, further comprising a support with a plurality of light sources, wherein the frame with the plurality of optical modules is arranged on the support so that each optical module is associated with one or more light sources of the plurality of light sources, wherein preferably each light source comprises one or more light emitting diodes with an optional primary optical element, e.g. a primary lens.
40. Luminaire comprising an optical assembly according to any one of the clauses 25-39.

BRIEF DESCRIPTION OF THE FIGURES

This and other aspects of the present invention will now be described in more detail, with reference to the appended drawings showing a currently preferred embodiment of the invention. Like numbers refer to like features throughout the drawings.

DESCRIPTION OF THE FIGURES

Figure 1:
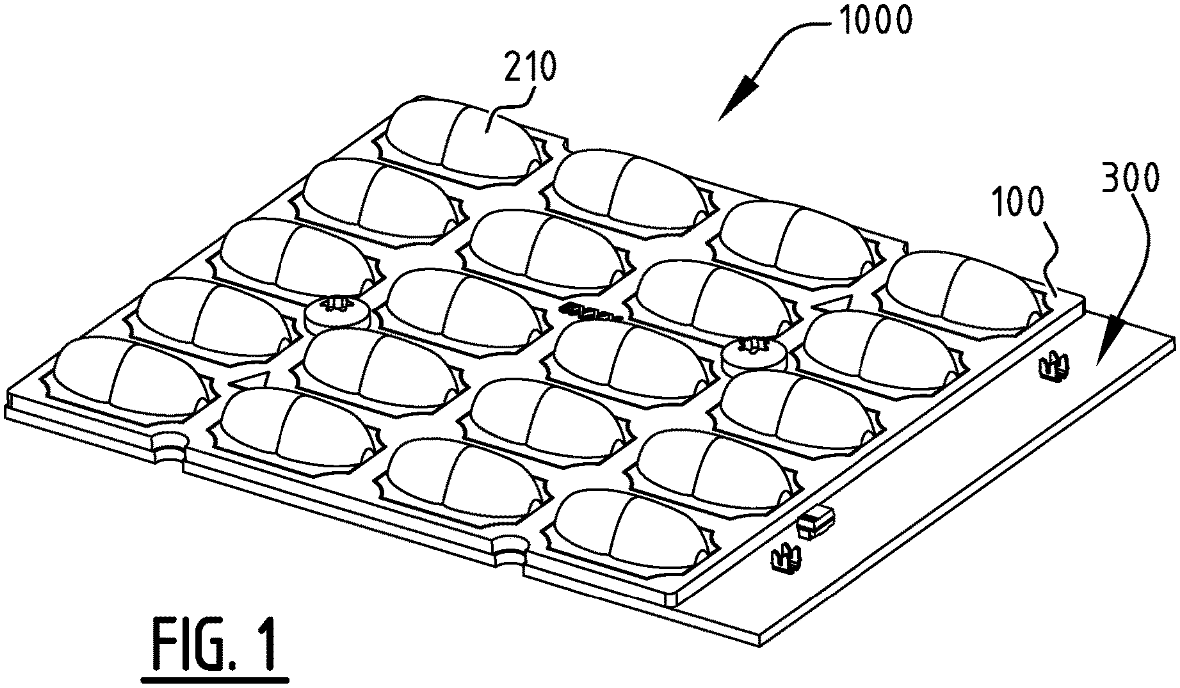
FIG. 1 is a schematic perspective view of an exemplary embodiment of an optical assembly.
Figure 2:
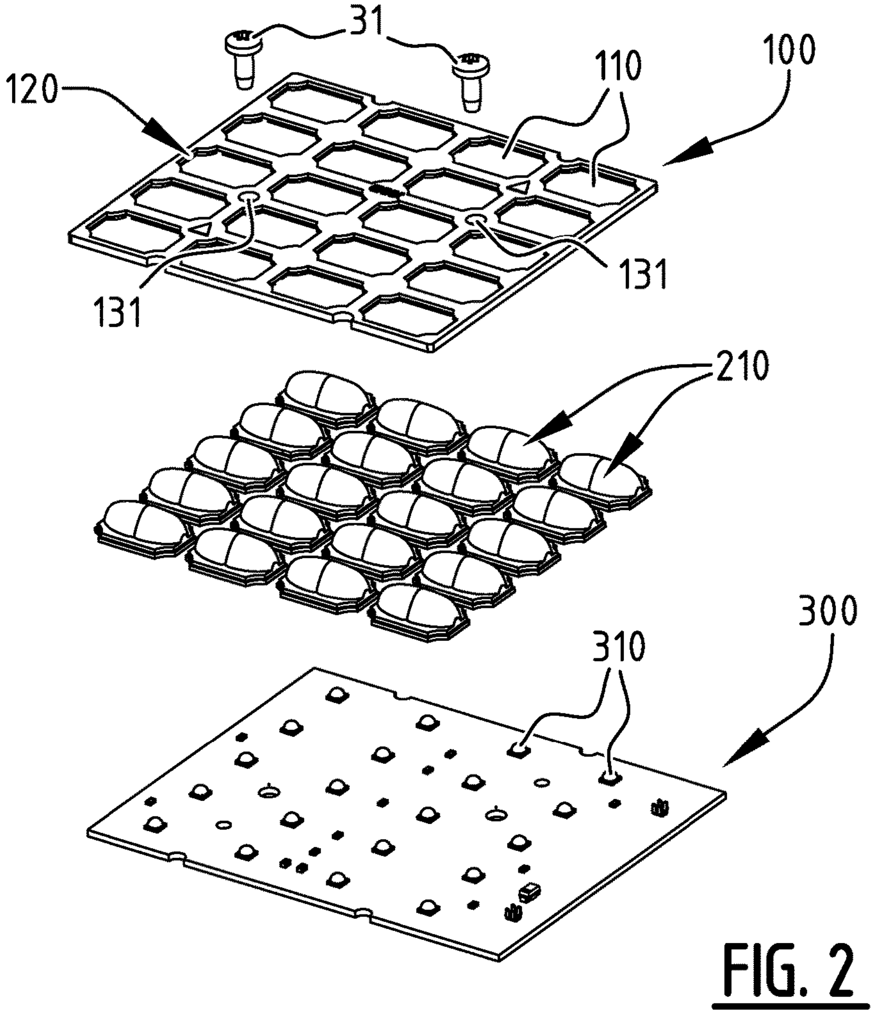
FIG. 2 is a schematic exploded perspective view of the exemplary embodiment of FIG. 1.
Figure 3:
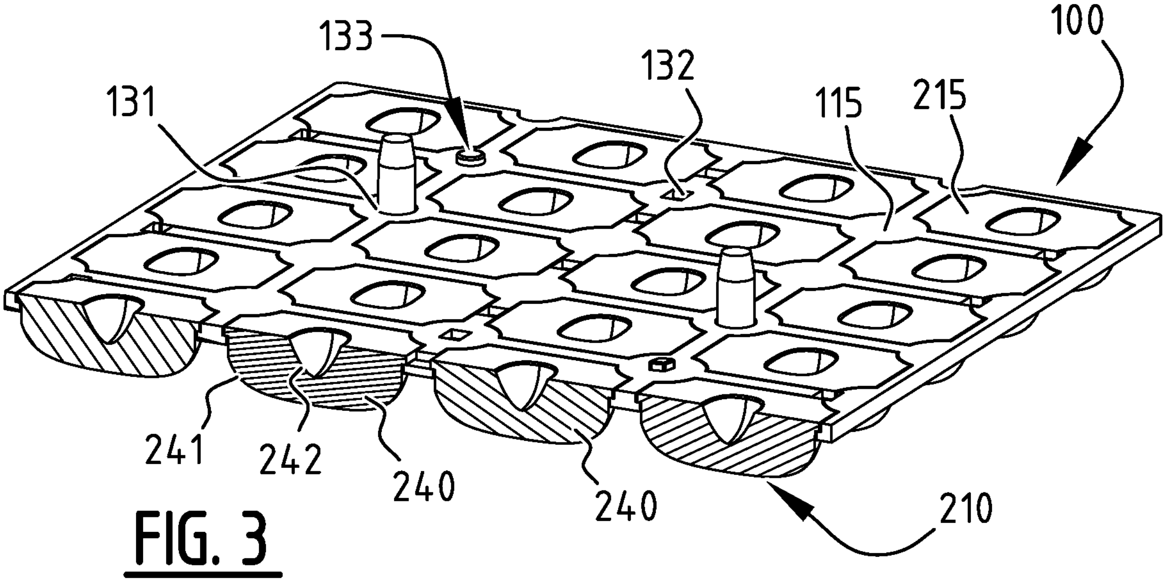
FIG. 3 is a partially cut perspective view of the frame and optical modules of the exemplary embodiment of FIG. 1, in a position in which the welding takes place.

FIGS. 1, 2 and 3 illustrate an optical assembly 1000 comprising a frame 100 with a plurality of openings 110, a plurality of optical modules 210 arranged in the frame 100, and a support 300 with a plurality of light sources 310, e.g. light emitting diodes optionally provided with a primary optics. Each optical module 210 is provided to a corresponding opening of the plurality of openings, and each optical module 210 is welded to the frame 100. Optionally multiple optical modules 210 may be arranged in a single opening 110. The openings 110 are shown to have the same shapes and sizes, but the frame may also be provided with openings having a different shape and/or size. More generally, the optical modules 210 may be the same or different and/or the openings 110 may be the same or different. Preferably, the openings 110 are the same and the optical modules 210 are the same or different but all fit in the same openings 110. Preferably, the plurality of openings 110 describes an array with a plurality of rows and a plurality of columns.

The frame 100 with the plurality of optical modules 210 is arranged on the support 300 so that each optical module is associated with one or more light sources 310 of the plurality of light sources 310. Preferably each light source comprises one or more light emitting diodes with an optional primary optical element, e.g. a primary lens.

In the illustrated example, the plurality of optical modules 210 is a plurality of lens modules, each lens module comprising a single free-form lens element 240. The lens element 240 comprises a lens portion having an outer surface 241 and an inner surface 242 intended to face an associated light source, wherein the outer surface 241 comprises a convex surface and the inner surface 242 comprises a concave surface joining the flat bottom surface 215. However, as described in the summary, embodiments may comprise any type of optical modules and a module can comprise one or more optical elements.

Figure 3A:
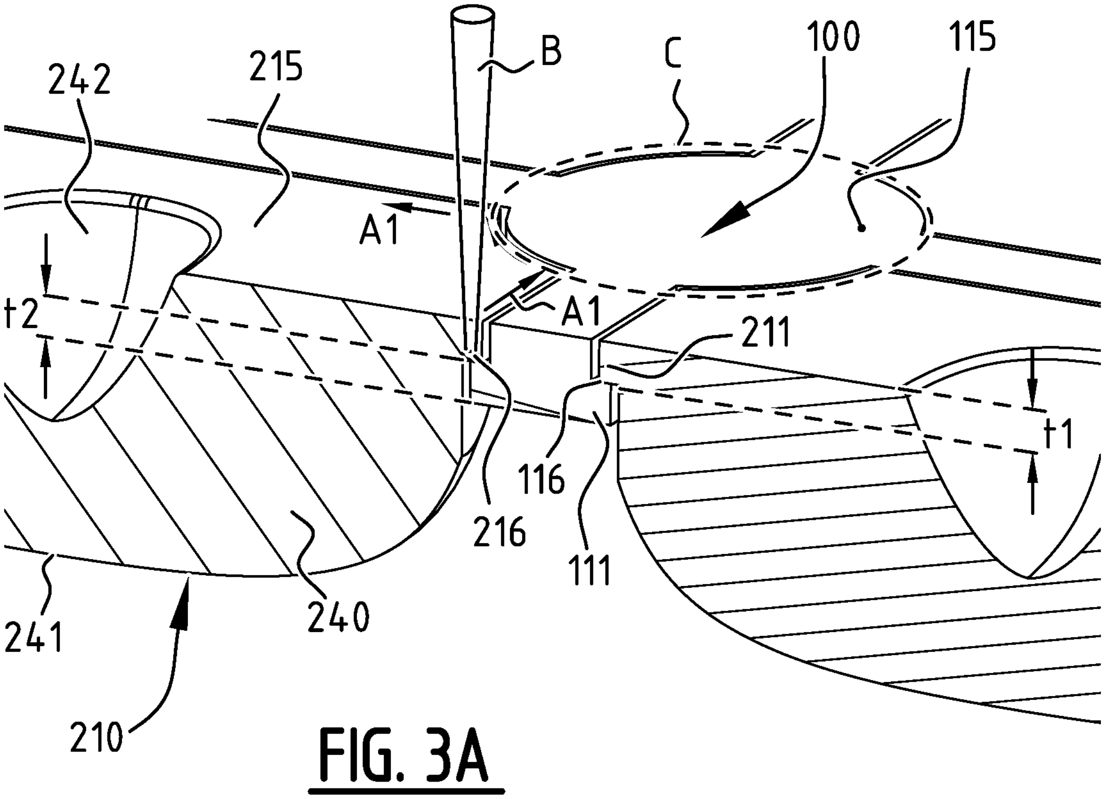
FIG. 3A is a detailed view of FIG. 3 illustrating the welding process.

A peripheral edge portion 211 of the optical module 210 is welded to the frame 100, see FIGS. 3 and 3A. Preferably, the optical module 210 is made integrally of a transparent material. The optical module may be made of a material comprising any one of the following or a combination thereof: poly-methyl methacrylate (PMMA), polycarbonate (PC), and the frame 100 may be made of a material comprising any one of the following or a combination thereof: acrylonitrile butadiene styrene (ABS), polybutylene terephthalate (PBT), polycarbonate (PC), poly-methyl methacrylate (PMMA). Optionally the frame 100 may comprise reinforcement fibers. In a preferred embodiment the frame may be made of polybutylene terephthalate (PBT) or a mixture of polycarbonate (PC) and acrylonitrile butadiene styrene (ABS).

The optical module 210 has a flat bottom surface 215, and preferably the bottom surface 215 is substantially at a same level as a second bottom surface 115 of the frame. The bottom surfaces 115, 215 are adapted for being arranged on a support 300, such as a PCB.

Each opening 110 in the frame 100 is delimited by a peripheral wall with at least one protruding portion 111 of a support means configured for supporting at least one peripheral portion 211 of the optical module. Preferably, the at least one peripheral portion 211 of the optical module 210 has a shape which is substantially complementary to the shape of the at least one protruding portion 111. In the embodiment of FIGS. 1-3, the at least one protruding portion 211 of the support means is shaped as a peripheral step portion, and the full periphery of the peripheral step portion 211 may be welded. Alternatively, only straight lines, see arrows A1, may be welded, or only a circular line C may be welded.

The plurality of optical modules 210 comprises four adjacent optical modules provided to four adjacent openings 110, and a portion of the frame 100 surrounded by the four adjacent openings 100 is provided with a hole 131 or a recess 132 or a protrusion 133. The holes 131 may be intended for receiving a fixation means 31 such as a bolt or a screw. The protrusions 133 and/or recesses 132 may be used e.g. for alignment or indication purposes. As illustrated, each opening 110 may have substantially the shape of a rectangle with cut-off corners, such that additional space is available for forming a hole 131 or a recess 132 or a protrusion 133 in between four corners.

Figure 4:
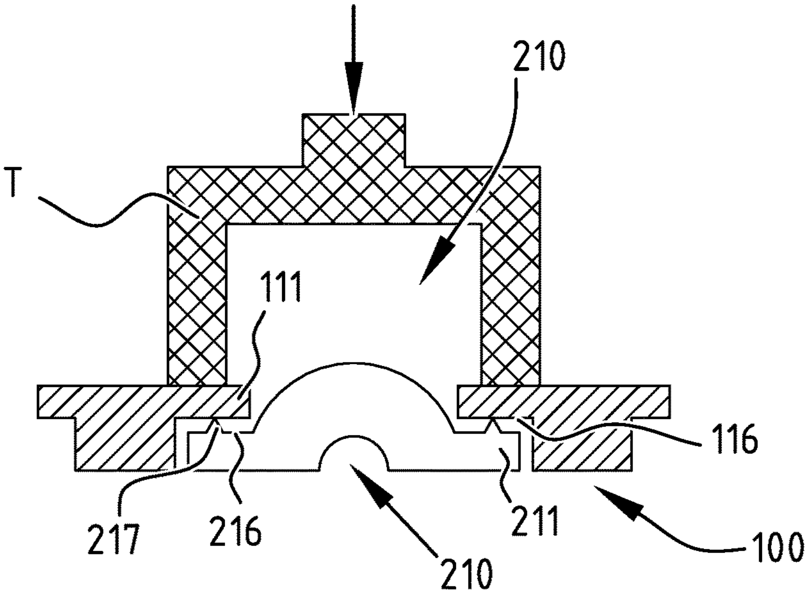
FIG. 4 is a cross-section of an alternative embodiment of an optical assembly with a frame in which optical modules are welded ultrasonically to the frame.
Figure 5A:
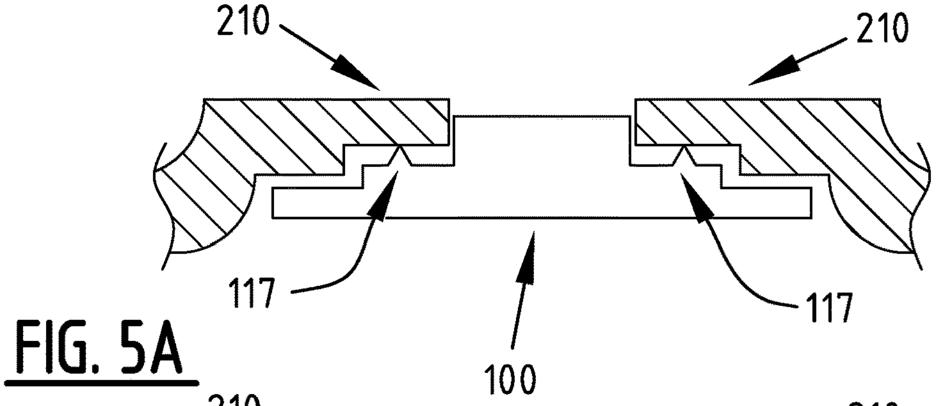
FIGS. 5A-5C are cross-sections similar to the cross-section of FIG. 4 for alternative embodiments using ultrasonic welding.
Figure 5B:
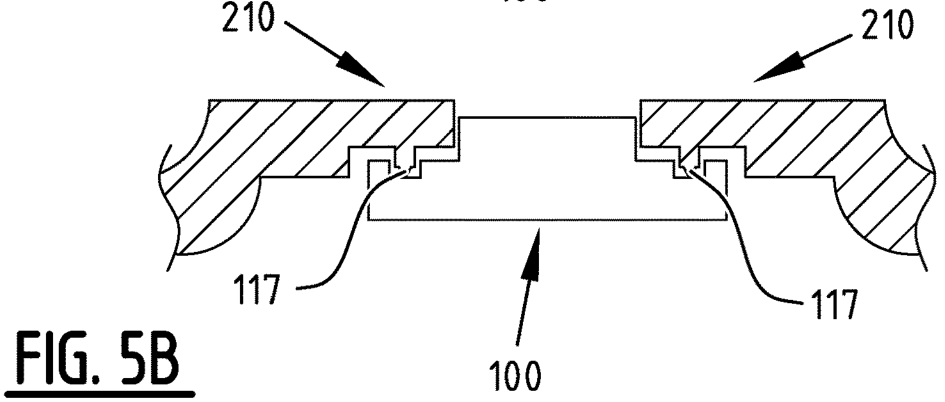
Figure 5C:
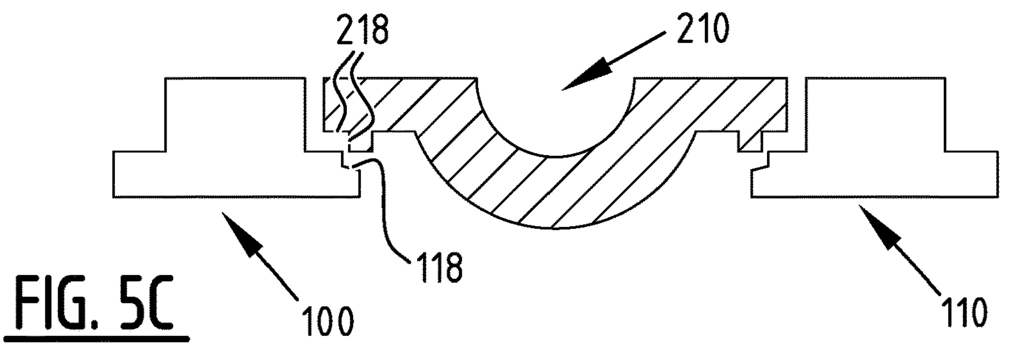
Figure 6:
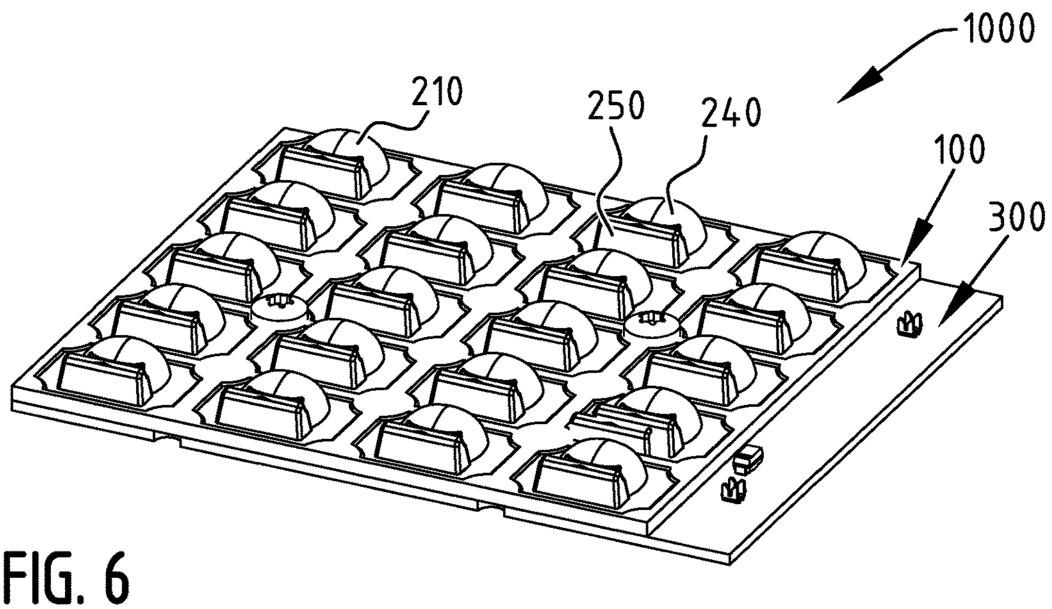
FIG. 6 is a schematic perspective view of another exemplary embodiment of an optical assembly.
Figure 7:
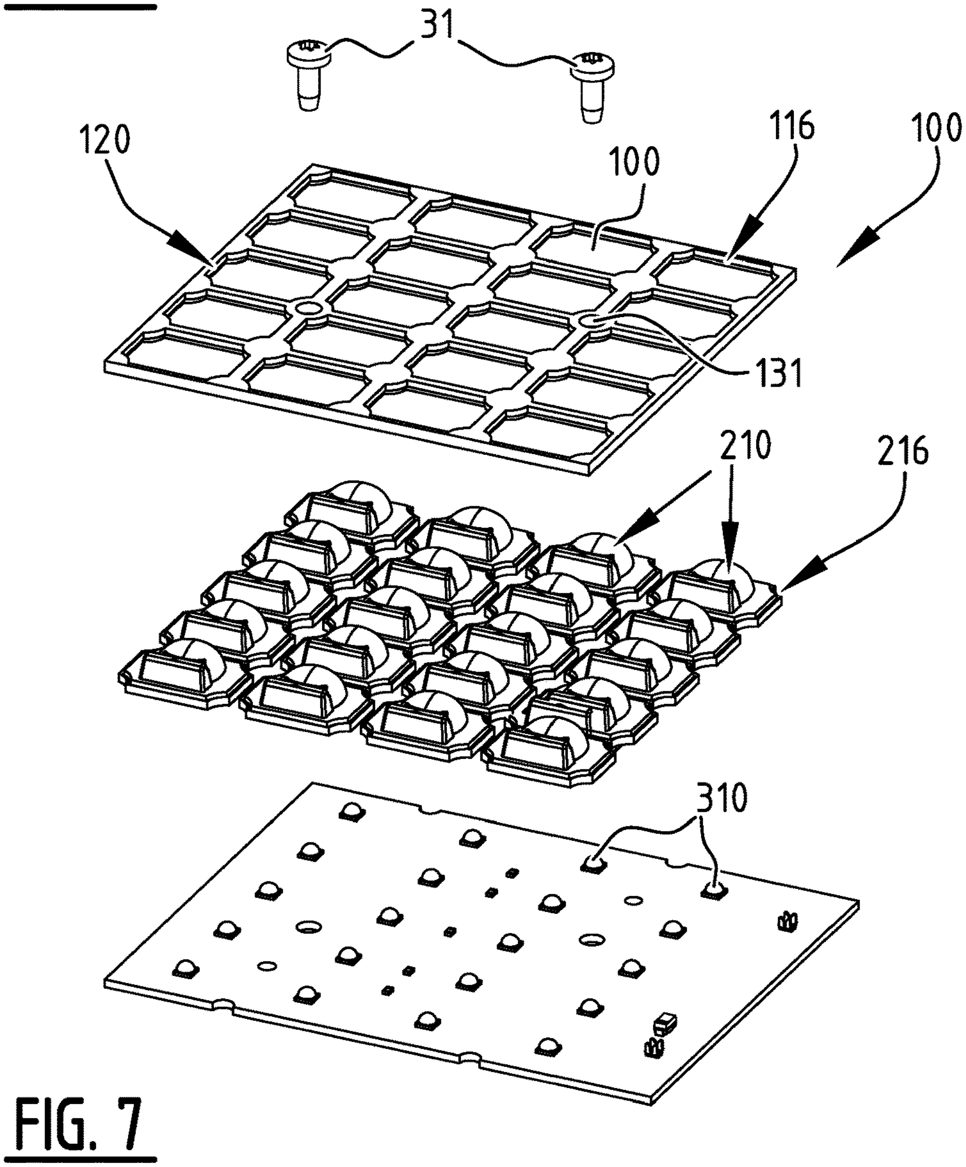
FIG. 7 is a schematic exploded perspective view of the exemplary embodiment of FIG. 6.

FIG. 3A illustrates welding using a laser beam B, but the welding could also be done using an ultrasonic welding head. FIG. 4 illustrates an alternative embodiment where ultrasonic welding by an ultrasonic welding tool T is used. The optical module 210 and the frame 100 are welded along joining surfaces 116, 216, and at least one surface of the joining surfaces 116, 216 is provided with an energy director 217 configured to concentrate ultrasonic energy and to initiate melting during the welding. In figure the joining surfaces form butt joints. As illustrated in FIGS. 5A and 5B the joining surfaces may also form step joints or tongue and groove joints. FIG. 5C illustrates a further embodiment where the welding is ultrasonic welding, and the optical module 210 and the frame 100 are welded along joining surfaces 118, 218 which form shear joints.

Figure 8:
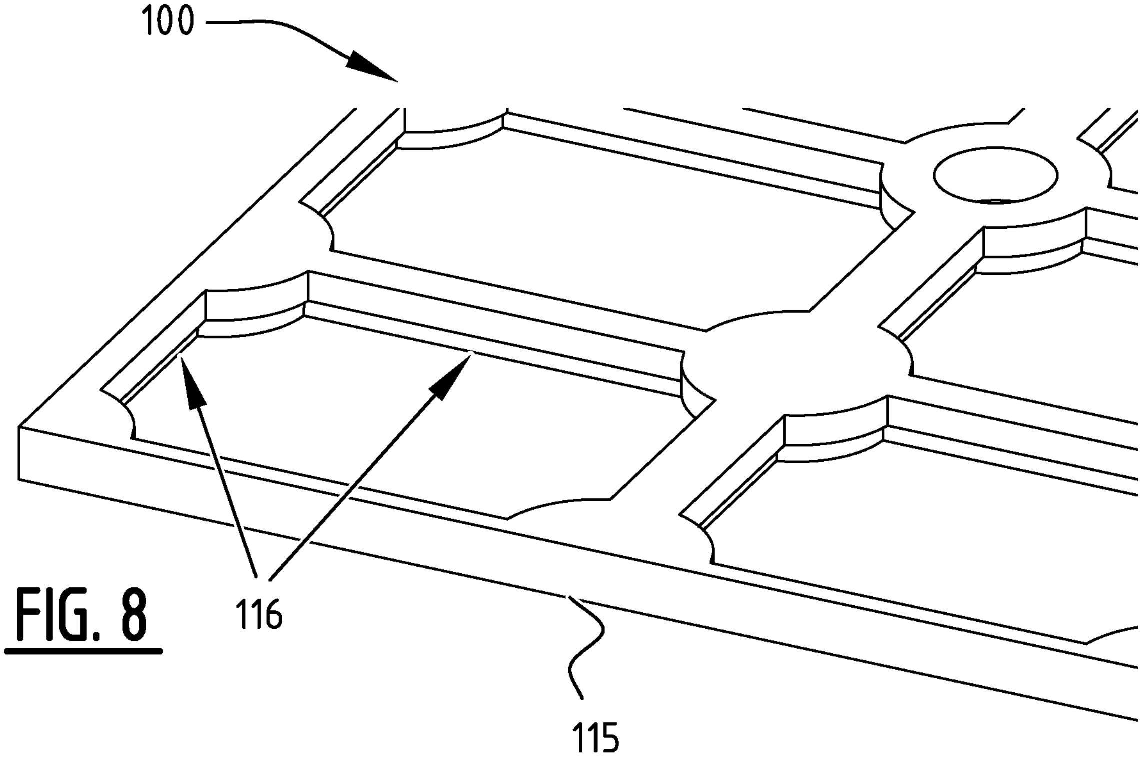
FIG. 8 is a partially cut perspective view of the frame and optical modules of the exemplary embodiment of FIG. 5.
Figure 9:
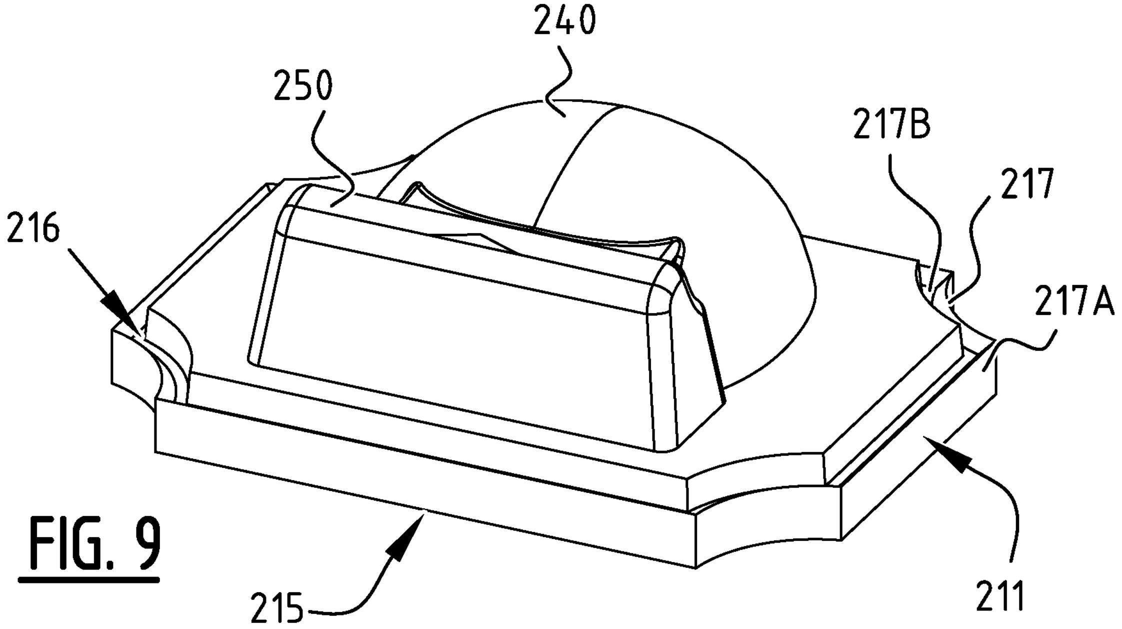
FIG. 9 is a detailed view of an optical module of the embodiment of FIG. 6.

FIGS. 6, 7, 8 and 9 illustrate another exemplary embodiment of an optical assembly suitable for ultrasonic welding. The same or similar components have been indicated with the same reference numerals as in the previous figures. In this embodiment, the optical modules 210 each comprise a lens element 240 and a backlight element 250. The optical module 210 and the frame 100 are welded along joining surfaces 116, 216, and at least one surface of the joining surfaces 116, 216 is provided with an energy director 217 configured to concentrate ultrasonic energy and to initiate melting during the welding. As can be seen in FIGS. 8 and 9 the outer periphery of the optical modules is provided with a stepped portion 211, and an energy director 217 is provided on the stepped portion 211 in a similar manner as in FIG. 4. As illustrated the energy director 217 may have an outer wall 217*a* directed perpendicular on the bottom surface 215 of the optical module and an inclined inner 217*b* which is oriented at an angle, preferably such that a top angle of the energy director 217 is between 20° and 70°. In other embodiments both the outer and inner wall of the energy director may be oriented at an angle different from 90° with respect to the bottom surface 215.

Figure 20:
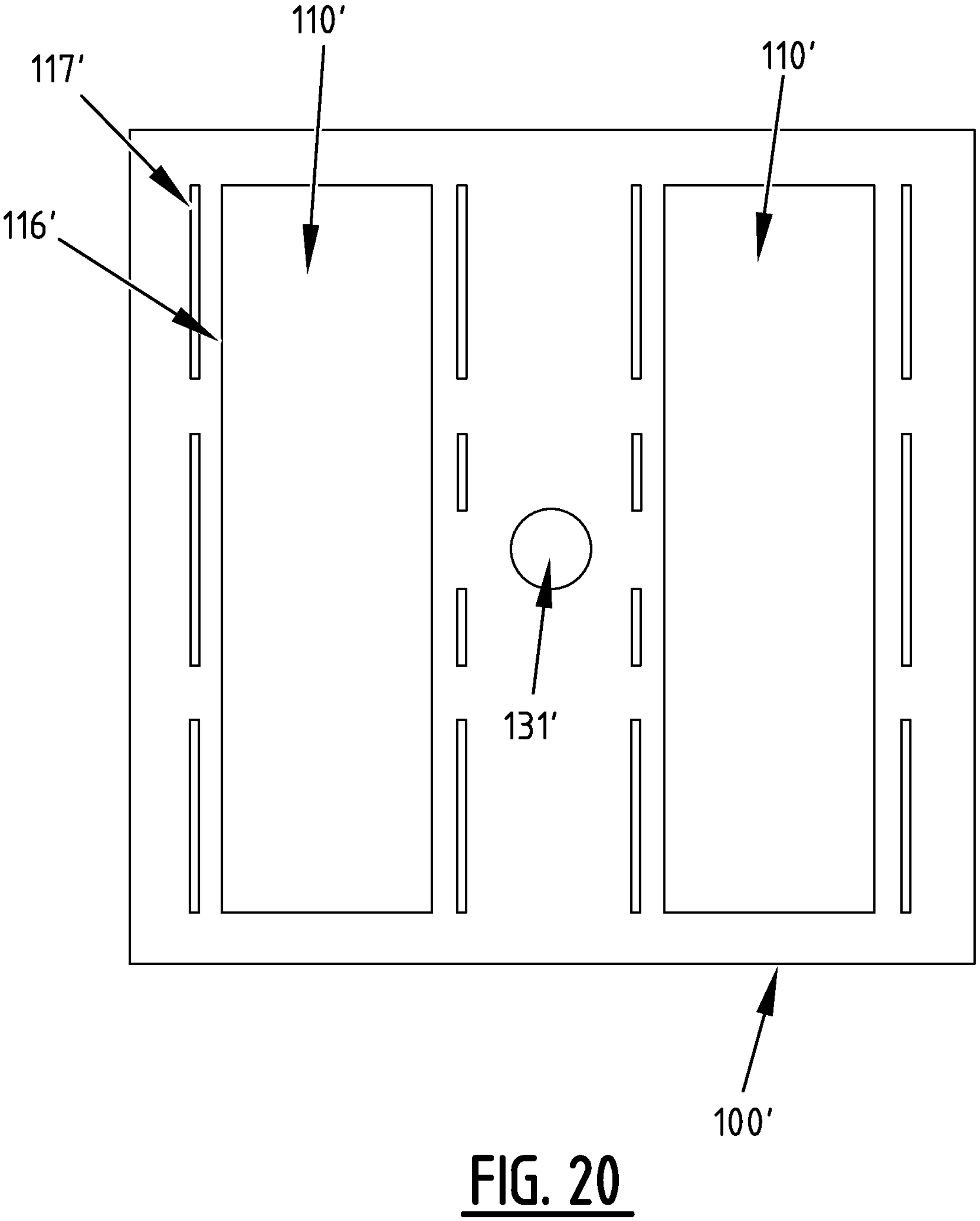
FIG. 20 illustrates yet another exemplary embodiment of an optical assembly suitable for ultrasonic welding.

FIG. 20 illustrates yet another exemplary embodiment of an optical assembly suitable for ultrasonic welding. In this embodiment, an opening 110' in a frame 100' may be dimensioned to receive a plurality of optical modules (not shown) one next to the other. Optionally, at least two optical modules may be assembled together using interlocking mechanical means, glue, and/or by magnetic force. In the embodiment of FIG. 20, there are two elongated openings 110' in the frame 100' which are designed each for a column of optical modules, preferably of four optical modules. The optical modules and the frame 100' are welded along joining surfaces 116' acting as support means, and at least one surface of the joining surfaces 116' is provided with an energy director 117' configured to concentrate ultrasonic energy and to initiate melting during the welding. As can be seen in FIG. 20, outer peripheries of the openings 110' are provided with a plurality of energy directors 117', preferably having a triangular profile. The plurality of energy directors 117' are provided in an interrupted manner on each side along the length of the openings 110'. The skilled person will understand that the plurality of energy directors 117' may also be provided to a step portion of the outer peripheries similarly as in the embodiments described with respect to FIGS. 4, 5A-5C. Additionally, a hole 131' between the openings 110' may be provided in the frame 100' and intended for receiving a fixation means such as a bolt or a screw.

Figure 10:
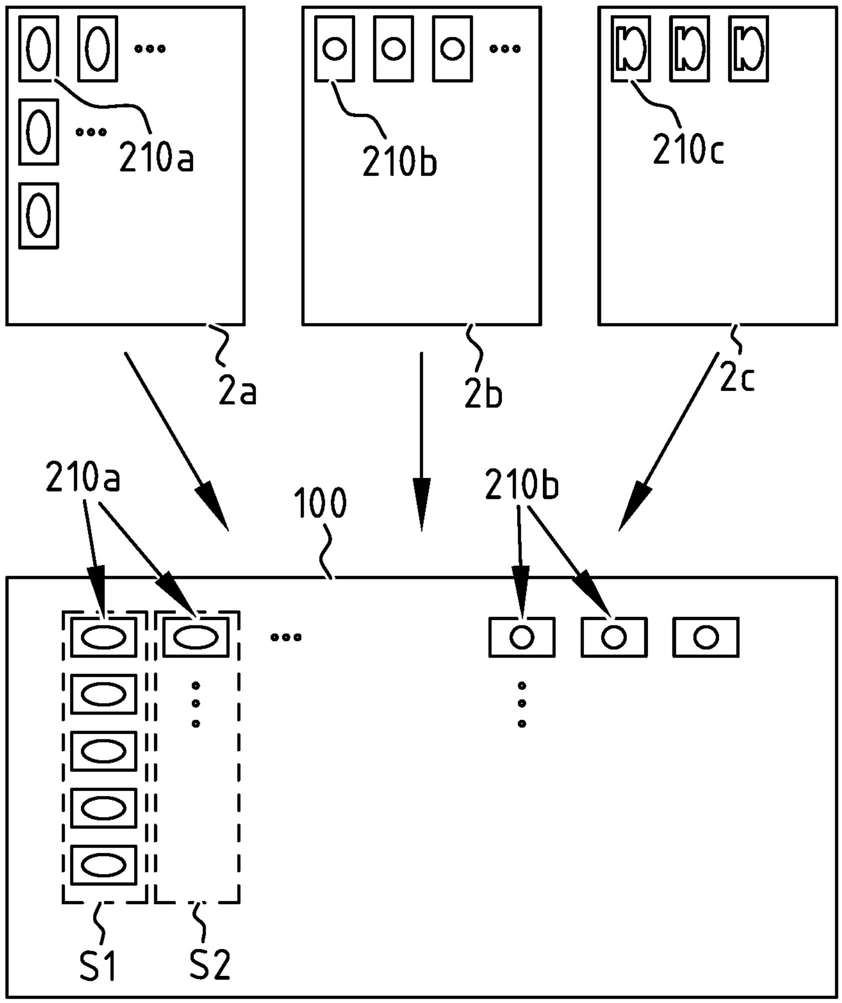
FIG. 10 illustrates the selecting of optical modules in accordance with an embodiment of the method.
Figure 11:
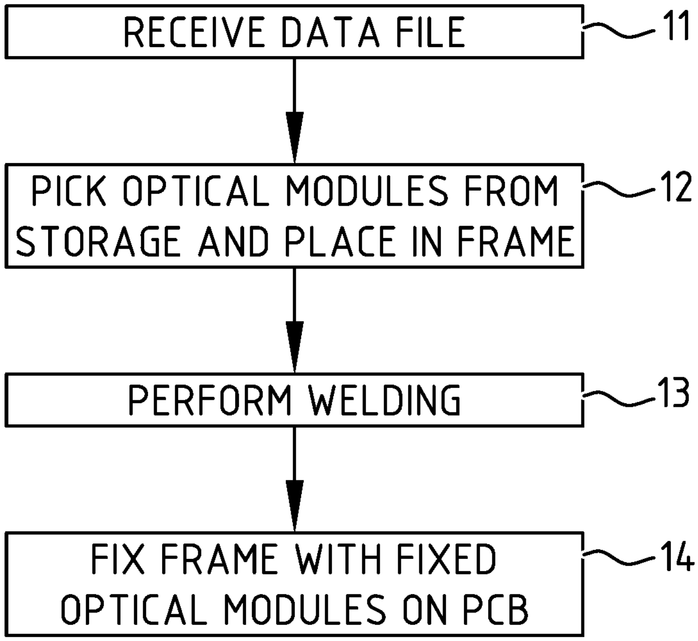
FIG. 11 illustrates a flow chart of an exemplary embodiment of a method for assembling optical modules.

FIGS. 10 and 11 illustrate schematically an exemplary embodiment of a method for assembling optical modules 210*a*, 210*b*, 210*c*. As illustrated in FIG. 11, the method comprises the following steps. In a first step 11 digital data representative for the optical modules to be included in the frame is received. In a second step 12, based on the received digital data in step 11, the plurality of optical modules is selected from a storage 2*a*, 2*b*, 2*c* comprising multiple different optical modules 210*a*, 210*b*, 210*c*, and placed in a frame 100 with at least one opening 110, see also FIG. 10. This picking and placing may be done automatically using a robotic arm controlled by a computing means based on the received digital data, but could also be done partially manually. The plurality of optical modules 210*a*, 210*b*, 210*c* is provided to the frame 100 such that each optical module of the plurality of optical modules is provided to an opening 110 of the plurality of openings 110. In the embodiment of FIG. 10, each opening 110 is provided with one optical module 210, but one could also have an opening 110 with a size which is a multiple of the size of the optical module 210 so that multiple optical modules can be arranged in a single opening 110. In a third step 13, the welding is performed. As explained above, the welding may be ultrasonic welding or laser beam welding or any other suitable welding technique. The welding may consist in welding one or more subsets S1, S2 of optical modules 210*a*, 210*b*, 210*c* simultaneously using one or more welding heads. For example a first subset S1 may be welded with a first welding head and a second subset S2 may be welded simultaneously with a second welding head. The subsets S1, S2 are shown to be columns in FIG. 10 but can be any group of optical modules, e.g. arrays of 2×2 optical modules or rows of optical modules, or arrays of 2×1 or 2×3 optical modules, etc.

Figure 12A:
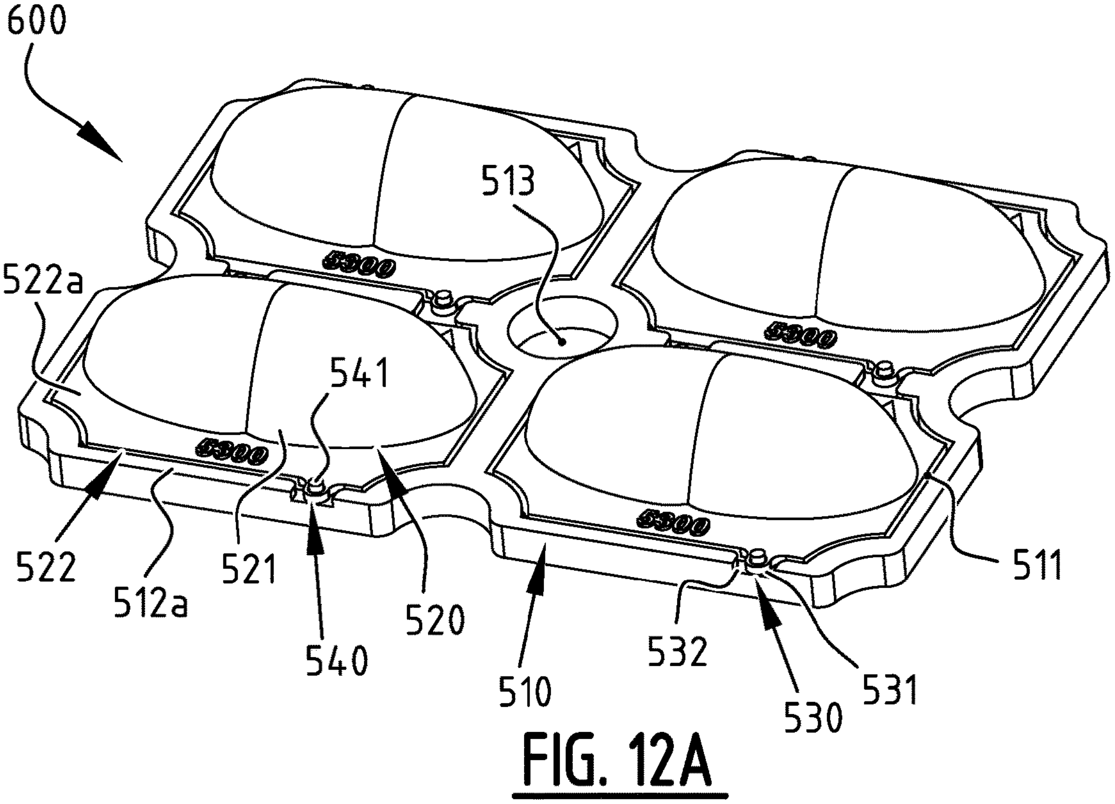
FIGS. 12A-12B are schematic perspective views from the top side and from the bottom side, respectively, of an exemplary embodiment of an optical assembly.
Figure 12B:
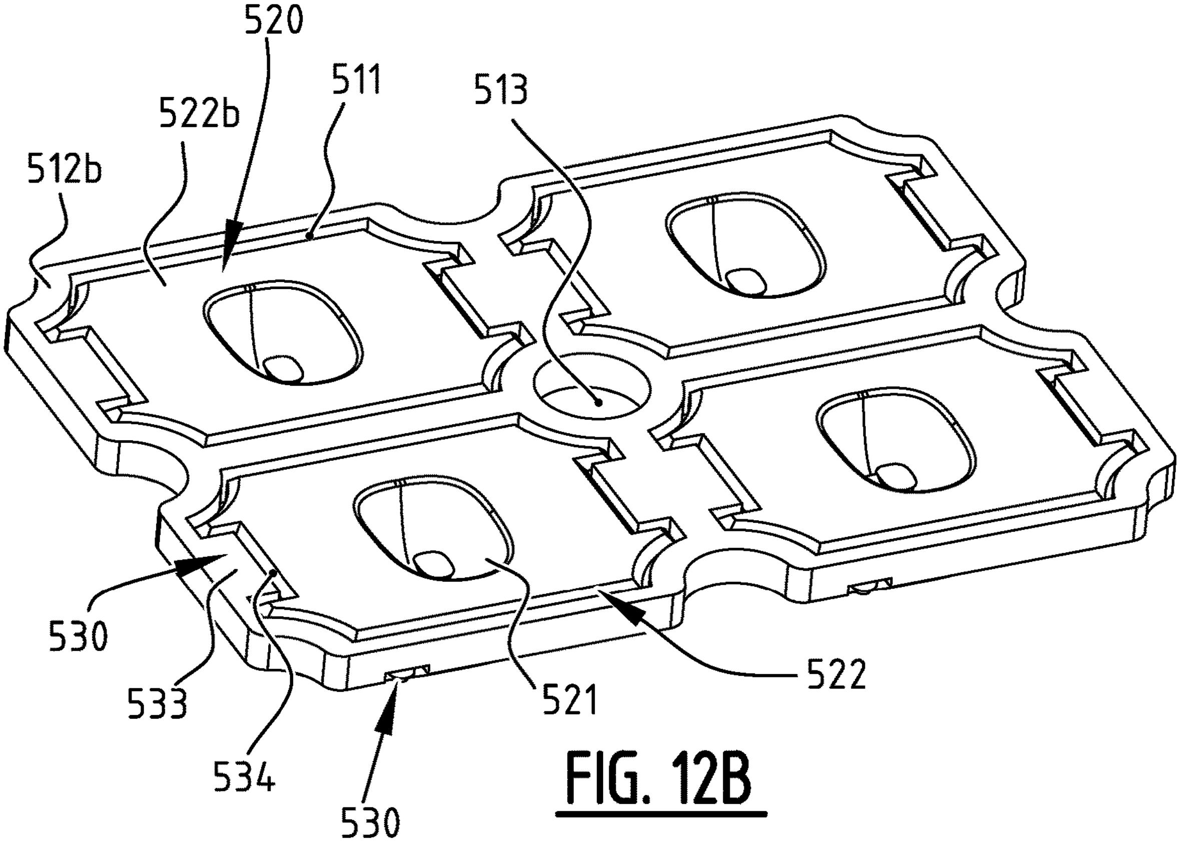

FIGS. 12A-12B are schematic perspective views from the top side and from the bottom side, respectively, of an exemplary embodiment of an optical assembly according to the present invention.

The optical assembly 500 comprises: a frame 510, a plurality of optical modules 520, a support means 530, and a plurality of pins 540. The optical assembly 500 may be included in a luminaire system.

The luminaire system typically comprises a luminaire head with a luminaire housing and optionally a luminaire pole. The luminaire head may comprise a supporting substrate, e.g. a PCB and at least one optical assembly, e.g. lens plates. The luminaire head may be connected in any manner known to the skilled person to the luminaire pole. Typical examples of such systems are street lights. In other embodiments, a luminaire head may be connected to a wall or a surface, e.g. for illuminating buildings or tunnels. In yet other embodiment, the luminaire head may be connected to catenary cables.

Preferably, the luminaire is an outdoor or industrial luminaire. By outdoor or industrial luminaires, it is meant luminaires which are installed on roads, tunnels, industrial plants, stadiums, airports, harbors, rail stations, campuses, parks, cycle paths, pedestrian paths or in pedestrian zones, for example, and which can be used notably for the lighting of an outdoor area or a large indoor area, such as roads and residential areas in the public domain, private parking areas and access roads to private building infrastructures, warehouses, industry halls, etc.

Figure 13:
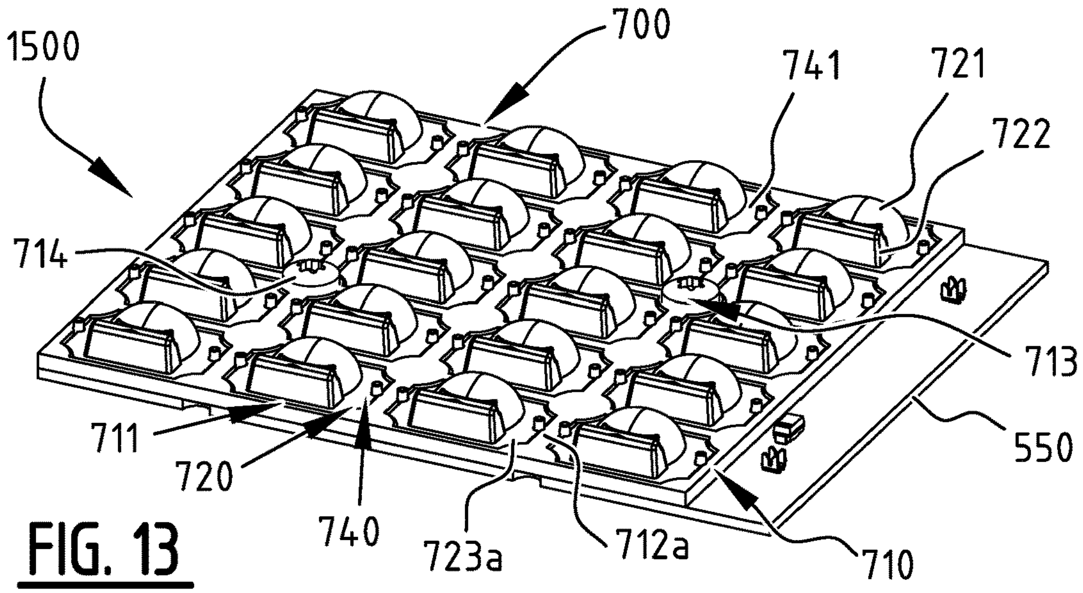
FIG. 13 illustrates schematically a perspective view of an exemplary embodiment of a lighting system.
Figure 14:
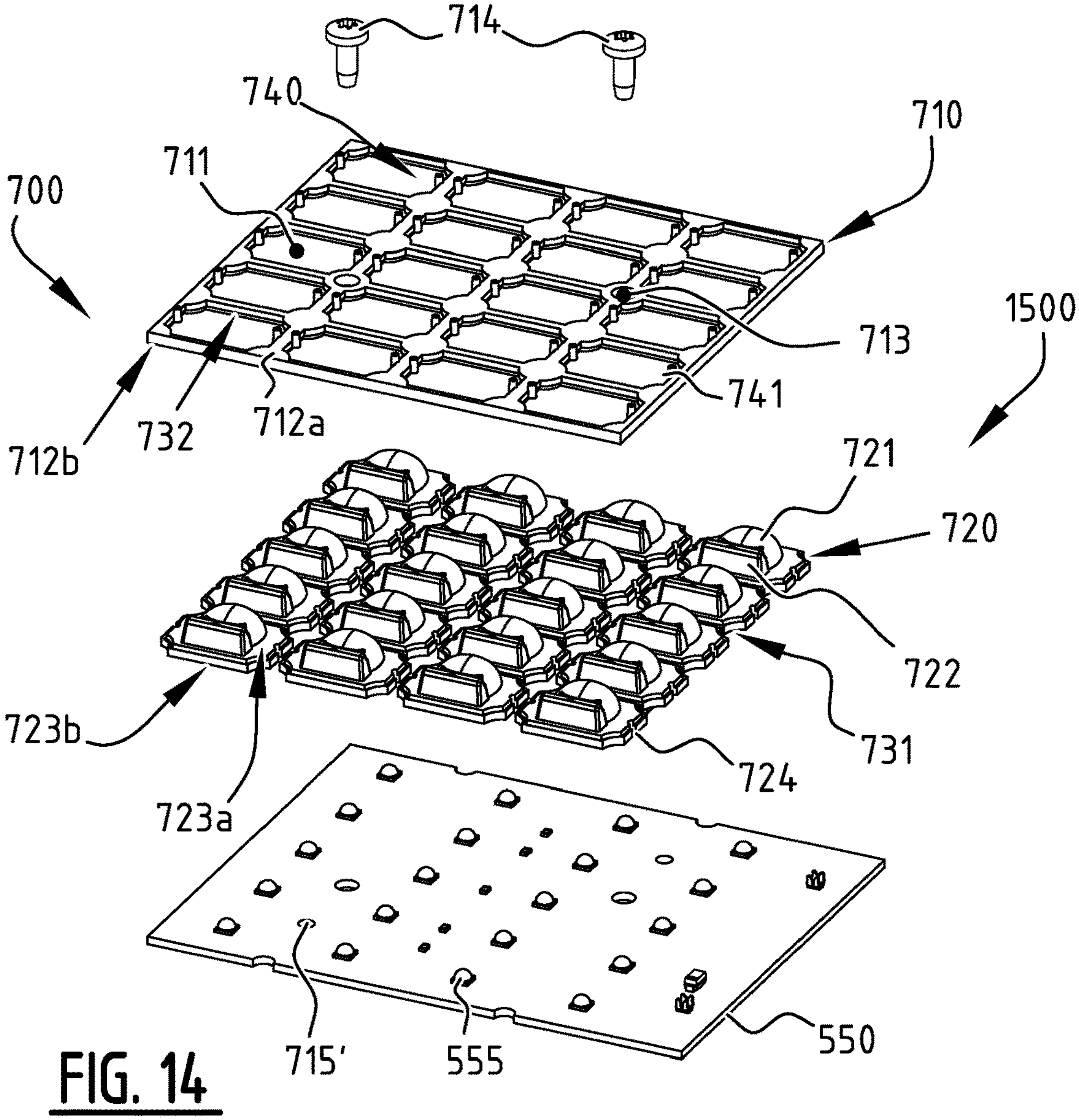
FIG. 14 is a schematic exploded perspective view of a lighting system with the exemplary embodiment of FIG. 13.

As can be seen in FIGS. 13 and 14, a support structure may comprise the supporting substrate 550, e.g. a PCB, and a heat sink (not shown) onto which the supporting substrate 550 may be mounted, said heat sink being made of a thermally conductive material, e.g. aluminium. Alternatively, the PCB may be mounted directly on the luminaire housing functioning as heat sink. A plurality of light sources 555 may be provided to the supporting substrate 550. The plurality of light sources 555 may comprise a plurality of LEDs. Further, each light source 555 may comprise a plurality of LEDs, more particularly a multi-chip of LEDs. The plurality of light sources 555 may be arranged without a determined pattern or in an array with at least two rows of light sources 555 and at least two columns of light sources 555, typically an array of more than two rows and more than two columns, an array of five rows by four columns in the embodiments of FIGS. 13 and 14. The surface onto which the plurality of light sources 555 is mounted can be made reflective or white to improve the light emission. The plurality of light sources 555 could also be light sources other than LEDs, e.g. halogen, incandescent, or fluorescent lamps.

Further, the light sources 555 may be similar or may have different colours or different colour temperatures. Additionally, each light source 555 may be associated with one or more optical elements (e.g. a lens and/or a reflector), or a number of light sources 555 may share one or more optical elements (e.g. one reflector and/or one lens and/or one diffusor for multiple light sources)

In FIGS. 12A-12B, each optical module 510 may comprise one or more optical elements, typically lens elements 521, associated with the plurality of light sources. Indeed, lens elements may be typically encountered in outdoor or industrial luminaire systems, although other types of optical elements may be additionally or alternatively present in such luminaires, such as reflectors, backlights, prisms, collimators, diffusors, and the like. The plurality of optical elements may be mounted such that each of the plurality of light sources is arranged opposite an optical element. In the exemplary embodiment shown in FIGS. 12A-12B, the optical elements are lens elements 521 which are similar in size and shape and there is one lens element 521 planned for each light source. Each lens element 521 comprises a concave surface configured for facing a corresponding light source, and a convex surface opposite the concave surface. The lens element 521 may be a secondary lens element while the corresponding light source may be provided with a primary lens element.

In another exemplary embodiment, some or all of the optical elements may be different from each other. In a further exemplary embodiment, there may be more optical elements than light sources, and the frame provided with the optical modules 510 may be movable such that a light source can be moved from a position opposite a first optical element to a position opposite a second optical element. In other embodiments, there may be provided a plurality of LEDs opposite some or all of the optical elements. The lens elements 521 may be in a transparent or translucent material. They may be in optical grade silicone, glass, poly(methyl methacrylate) (PMMA), polycarbonate (PC), or polyethylene terephthalate (PET), ABS, or PBT, preferably PMMA.

The optical elements may each be surrounded by a mounting portion 522. The mounting portion 522 may be configured for mounting the optical module 520 within a corresponding opening 511 of the frame. The mounting portion 22 and the optical element may be integrally formed. The mounting portion 522 in FIGS. 12A-12B comprises a plate surrounding the lens element 521 of the optical module with an upper flat surface 522*a* and a bottom flat surface 522*b* opposite the upper flat surface 522*a*, said bottom flat surface 522*b* facing a light source in a mounted state of the optical assembly 500.

The frame 510 comprises at least one opening 511, a plurality of openings 511 in the embodiments of FIGS. 12A-12B. At least one optical module 520 of the plurality of optical modules is provided per opening 511 of the plurality of openings. In the embodiment of FIGS. 12A-12B, there is one optical module 520 provided per opening 511. In another embodiment, there may be a plurality of optical modules provided per opening such that the plurality of optical modules fills the corresponding opening. More generally, the optical modules 520 may be the same or different and/or the openings 511 may be the same or different. Preferably, the openings 511 are the same and the optical modules 520 are the same or different but all fit in the same openings 511. Preferably, the plurality of openings 511 describes an array with a plurality of rows and a plurality of columns.

The frame 510 may be in an opaque, transparent, or translucent material, preferably in a transparent material. It may be in ABS, PBT, PMMA, PC, or a combination thereof. In a preferred embodiment the frame may be made of polybutylene terephthalate (PBT) or a mixture of polycarbonate (PC) and acrylonitrile butadiene styrene (ABS).

The plurality of openings 520 may be arranged in an array, an array of two lines by two columns in the embodiment of FIGS. 12A-12B. The support means 530 is provided to each of the plurality of optical modules 520 and/or to each of the plurality of openings 511. The support means 530 is configured for supporting the optical module 520 at least partially within the opening 511 of the frame. In an embodiment, the optical module 520 may be supported at least partially within the opening 511 using glue. In another embodiment, the optical module 520 may be supported at least partially within the opening 511 using magnetic forces. Preferably, the support means 530 is a mechanical support means. In the embodiment of FIG. 12A-12B, the support means 530 comprises elements 531, 534 integrally formed with the optical module 520 and elements 532, 533 integrally formed with the frame 510.

The support means 530 may be configured such that, when the optical module 520 is assembled to the frame 510, the bottom surface 522*b* of the optical module is substantially at a same level as a bottom surface 512*b* of the frame, said bottom surface 522*b* of the optical module and bottom surface 512*b* of the frame being adapted for facing a plurality of light sources. One can thus obtain an optical assembly 600 with a flush bottom side which allows for an accurate placement of the optical assembly 600 over light sources against the supporting substrate.

The support means 530 may comprise at least one tab 533 extending substantially parallel to a plane of the opening 511 of the frame. In the embodiment of FIGS. 12A-12B, the support means 530 comprises a plurality of tabs 533 which extends inwardly inside the opening 511. There may be two tabs 533 in diametrical opposition of one another. In another embodiment, there may be only one tab, a peripheral tab to the opening 511 for example. In yet another embodiment, there may be more than two tabs. By extending inwardly, the plurality of tabs 533 may prevent the optical module 520 to fall through the corresponding opening 511. Indeed a distance between extremities of the tabs 533 is less than a corresponding longitudinal distance of the bottom surface 522*b* of the optical module.

In the embodiment of FIGS. 12A-12B, the plurality of tabs 533 may be configured for being provided to a plurality of complementary indents 34 formed in the optical module 520. More particularly, the tabs 533 may extend in prolongation of the bottom surface 512*b* of the frame, and the complementary indents 534 may be formed in the bottom surface 522*b* of the optical module such that, when the optical module 520 is arranged at least partially within the opening, the bottom surface 512*b* of the frame and the bottom surface 522*b* of the optical module are flush with each other.

In the embodiment of FIGS. 12A-12B, the upper surface 512*a* of the mounting portion is provided with a plurality of tongues 531. The plurality of tongues 531 may extend substantially parallel to the plane of the opening 511 of the frame. The plurality of tongues 531 may extend in prolongation of the upper surface 522*a* of the optical module. In the embodiment of FIGS. 12A-12B, there may be two tongues

531 in diametrical opposition of one another. In another embodiment, there may be only one tongue. In yet another embodiment, there may be more than two tongues. By extending outwardly, the plurality of tongues 531 may prevent the optical module 520 to fall through the corresponding opening 511. Indeed a distance between extremities of the tongues 531 is more than a corresponding lateral distance of the upper surface 512*a* of the optical module.

The plurality of tongues 531 may be received in a corresponding plurality of indents 532 formed in the upper surface 512*a* of the frame. The skilled person will understand that either of the plurality of tongues 531 or the plurality of tabs 533 are sufficient on their own as the support means 530.

In the embodiment of FIGS. 12A-12B, the plurality of optical modules 520 comprises four adjacent optical modules 520 provided to four adjacent openings 511 of the plurality of openings. A portion of the frame surrounded by the four adjacent openings 511 may be provided with a hole or a recess or a protrusion, a through-hole 513 in the present embodiment. The through-hole 513 may be adapted for a fixation means (not shown) configured for fixing the optical assembly 600 to the support structure. Additionally, each opening 511 may have substantially the shape of a rectangle with cut-off corners. In that manner additional space is provided for arranging a hole or a recess or a protrusion as required. The plurality of tongues 531 and the plurality of tabs 533 may be located on different sides of the rectangular shape of the opening; thereby insuring a stable support of the optical module 520.

The plurality of pins 540 comprises each a portion 541 configured for being plastically reshaped under an application of heat and/or pressure to assemble the plurality of optical modules 520 to the frame 510. The reshapable portion 541 may be located at one or more ends of the pin 540. In an embodiment, the plurality of pins 540 may be arranged at the periphery of optical modules 520 such that, when reshaped, the reshapable portion 541 of the pin overlaps the frame 510 and the optical module 520. In another embodiment the plurality of pins 540 is integrally formed with the optical module 520 and the reshapable portion 541 of each pin overlaps, when reshaped, the frame 510. There may be one or more pins 540 per optical module 520 to achieve the assembly with the frame 510. In an embodiment, one pin may be used to assemble a plurality of optical modules by overlapping, when reshaped, over at least two optical modules and/or the frame. In the embodiment, of FIG. 12A-12B, the plurality of pins 540 is integrally formed with the frame 510 and extends through corresponding through-holes in the tongues 531. The reshapable portion 541 of each pin 540 overlaps, when reshaped, the corresponding optical module 520.

When providing the plurality of pins 540 to the plurality of optical modules 520, at least one optical module 520 of the plurality optical modules being at least partially arranged within each opening 511 of the plurality of openings, each of the reshapable portions 541 may protrude from the upper surface 522*a* of the optical module, the upper surface 512*a* of the frame, the bottom surface 522*b* of the optical module, and/or the bottom surface 512*b* of the frame.

For each opening 511 and optical module 520 paired, at least one recess may be provided to the optical module 520 and/or to a surface adjacent to the opening 511, said at least one recess being configured for receiving a portion of the pin 540. In the embodiment of FIGS. 12A-12B, one recess is provided to each of the plurality of tongues 531. The recess is a through-hole through a tongue 531. Each pin 540 is extending, upwardly, away from the indent 532 in the upper surface 512*a* of the frame. Thus, the plurality of tongues 531 comprises each a peripheral surface of the at least one recess configured as the support means 530 for supporting the corresponding optical module 520 at least partially within the opening 511 of the frame. The reshapable portion 541 of each pin may be protruding out of the recess.

FIG. 13 illustrates schematically a perspective view of an exemplary embodiment of a lighting system according to the present invention. FIG. 14 illustrates schematically an exploded view of the exemplary embodiment of FIG. 13. The lighting system 1500 comprises a support structure 550 and an optical assembly 700. The optical assembly 700 comprises: a frame 710, a plurality of optical modules 720, a support means 731, 732, and a plurality of pins 740. The optical assembly 700 comprises a plurality of optical modules 720 arranged in an array, an array of five rows by four columns in the present embodiment.

In the embodiment of FIG. 14, a plurality of light sources 555 is arranged on the support structure 550, each of the plurality of light sources corresponding to one optical module 720 of the plurality of optical modules. The support structure 550 may comprise one or more PCBs. For convenience, the support structure 550 is shown in FIGS. 13 and 14 as a single plate, but the skilled person understands that the support structure 550 may also be formed with a plurality of PCBs.

Figure 16A:
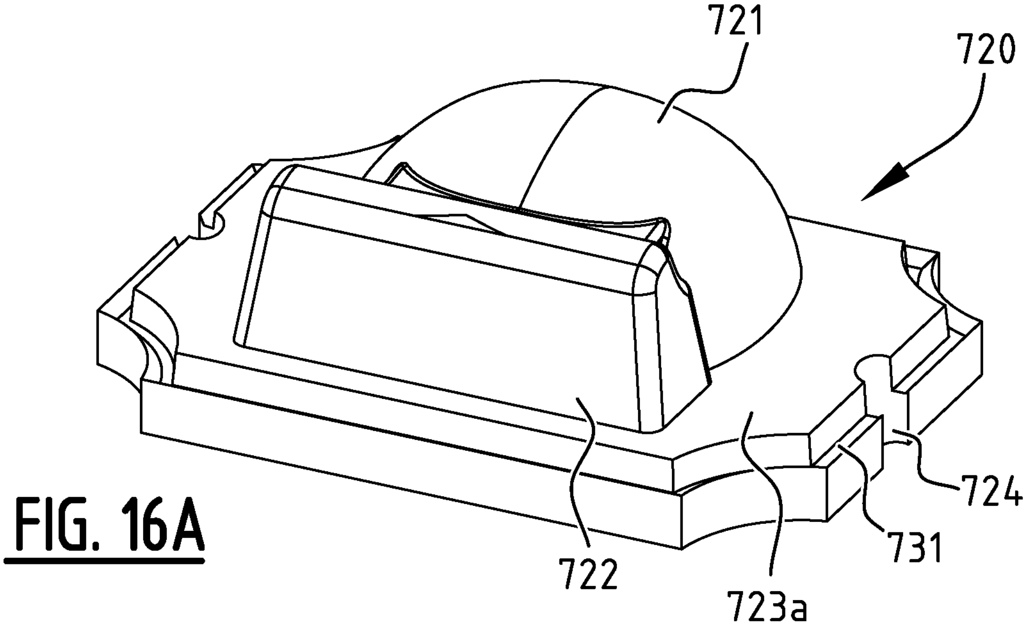
FIGS. 16A-16B are close-up views of the optical module of the exemplary embodiment of FIGS. 13 and 14.
Figure 16B:
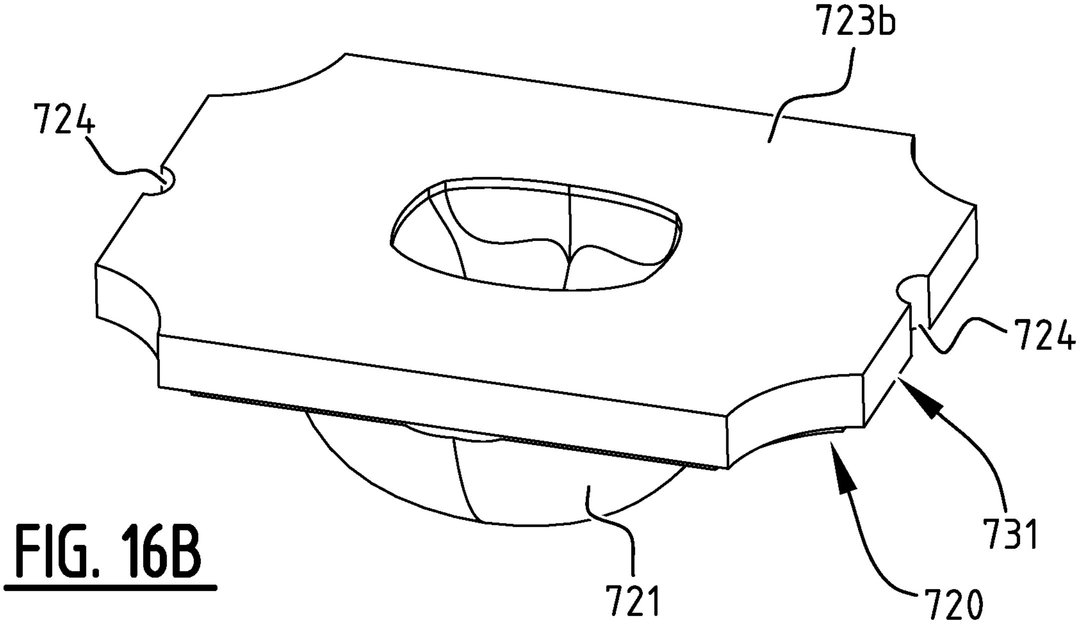

The optical modules 720 of FIGS. 13 and 14 may comprise lens modules comprising each a lens element 721. The plurality of optical modules 720 may all be similar or there may be different optical modules. Further, it should be clear for the skilled person that the plurality of optical modules 720 may additionally or alternatively comprise other elements than lens elements 721, such as reflectors, backlight elements, collimators, diffusors, and the like, backlight elements 722 in the present embodiment. FIGS. 16A-16B are close-up views of the optical module of the exemplary embodiment of FIGS. 13 and 14.

The lens element 721 may be free form in the sense that it is not rotation symmetric. In the embodiments of FIGS. 13 and 14, the lens elements 721 have a symmetry axis. In another embodiment, the lens elements may have no symmetry plane/axis. Each optical module 720 may be moulded in a transparent or translucent material. The optical modules 720 may be e.g. in optical grade silicone, glass, poly(methyl methacrylate) (PMMA), polycarbonate (PC), or polyethylene terephthalate (PET), ABS, PBT, or a combination thereof, preferably in PMMA. Optionally a reflective coating may be provided on a portion of the optical module 720.

Figure 15A:
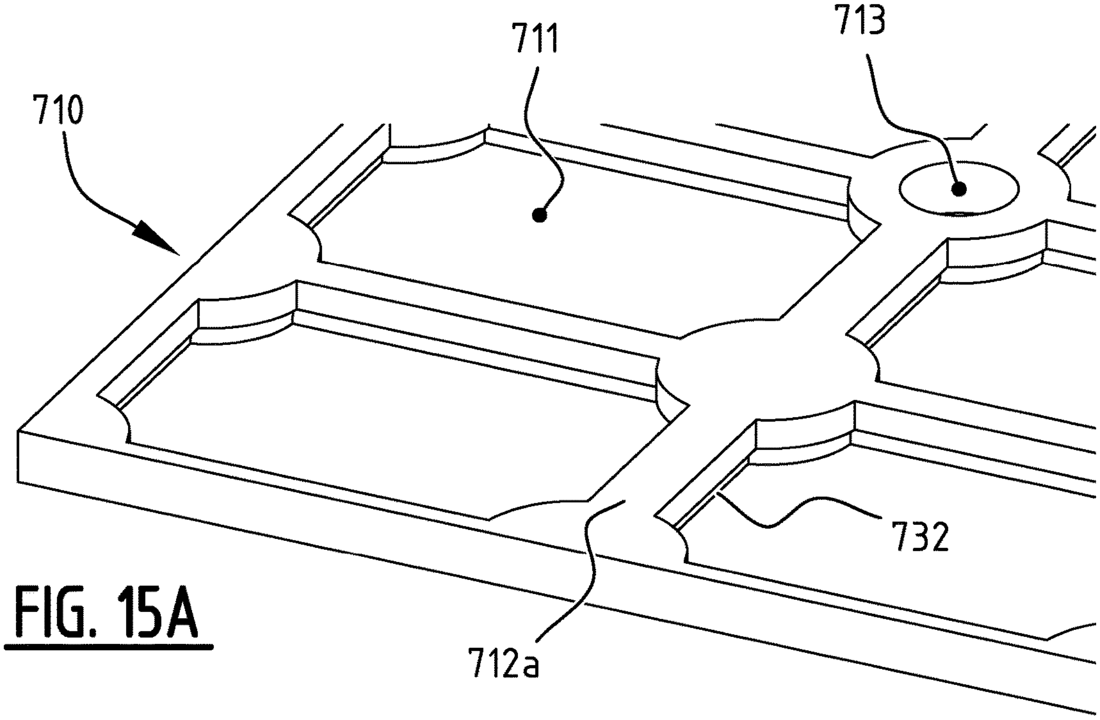
FIGS. 15A-15B are partially cut perspective views of the frame of the exemplary embodiment of FIGS. 13 and 14.
Figure 15B:
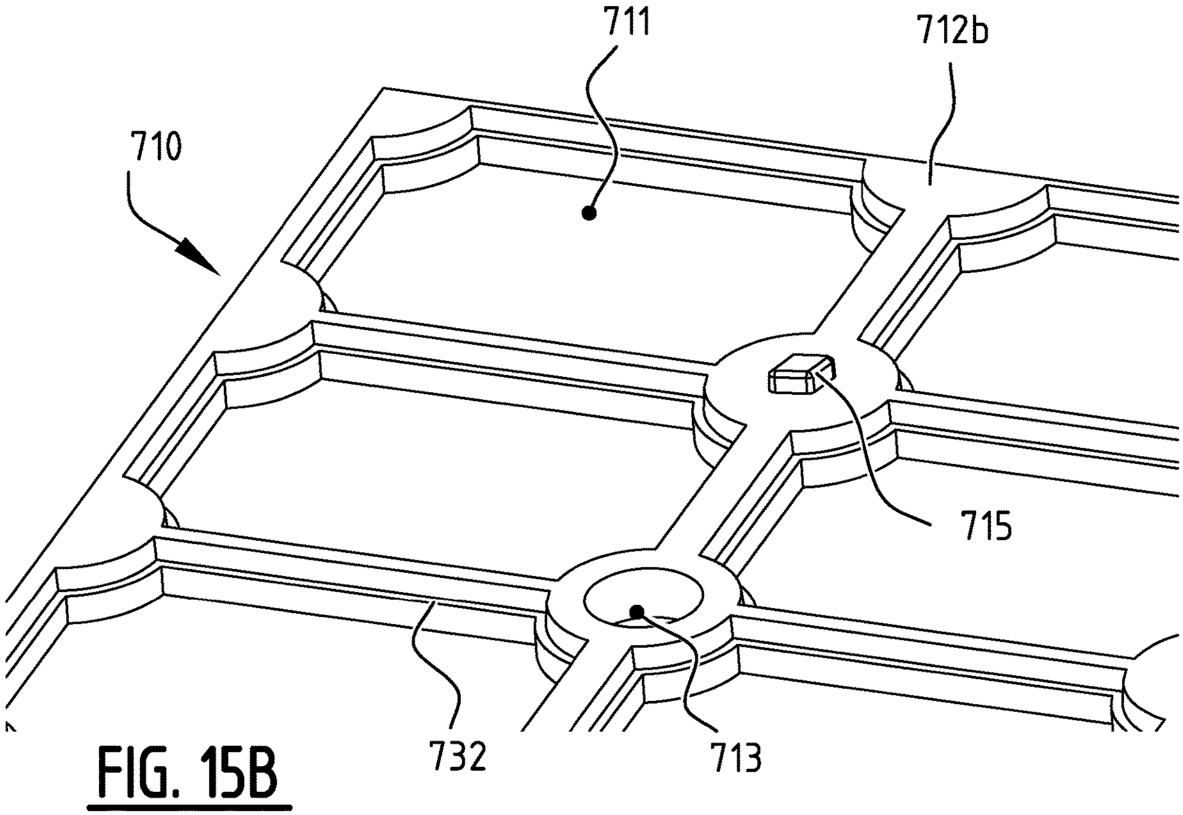

FIGS. 15A-15B are partially cut perspective views of the frame of the exemplary embodiment of FIGS. 13 and 14. A portion of the frame surrounded by four adjacent openings 711 may be provided with a hole or a recess or a protrusion, a through-hole 713 in the present embodiment. The through-hole 713 may be adapted for a fixation means (now shown in FIG. 15A but may be similar to the fixation means 714 in FIG. 14) configured for fixing the optical assembly 700 to the support structure 550 or to an element of the support structure 550 below the PCB of the support structure 550. Additionally, each opening 711 may have substantially the shape of a rectangle with cut-off corners. In that manner additional space is provided for arranging a hole or a recess or a protrusion as required.

The support means 731, 732 of FIGS. 13 and 14 may comprise at least one tab extending substantially parallel to a plane of the opening 711 of the frame. The at least one tab 732 may extend inwardly inside the opening 711 around a periphery of the opening 711. By extending inwardly, the peripheral tab 732 may prevent the optical module 720 to go through the corresponding opening 711. Indeed a distance between opposite extremities of the peripheral tab 732 may be less than a corresponding longitudinal distance of a bottom surface 723*b* of the optical module 720. The peripheral tab 732 may be configured for being provided to a complementary peripheral indent 731 formed in the optical module 720. More particularly, the peripheral tab 732 may extend in prolongation of the upper surface 712*a* of the frame 710, and the complementary peripheral indent 731 may be formed in the upper surface 723*a* of the optical module 720 such that, when the optical module 720 is arranged at least partially within the opening 711, the upper surface 712*a* of the frame 710 and the upper surface 723*a* of the optical module 720 are flush with each other. In another embodiment, the support means comprises a plurality of tabs extending inside the opening 711.

The plurality of pins 740 comprises each a portion 741 configured for being plastically reshaped under an application of heat and/or pressure to assemble the plurality of optical modules 720 to the frame 710. The reshapable portion 741 may be located at one end of the pin 740, at an ends of the pin 740 opposite the peripheral tab 732 in the embodiments of FIGS. 13 and 14. The plurality of pins 740 may be arranged at the periphery of optical modules 720 such that, when reshaped, the reshapable portions 741 of the pins overlap the frame 710 and the optical module 720. In the embodiments of FIGS. 13 and 14 the plurality of pins 740 is separately formed from the frame 710, and the reshapable portions 741 of each pin overlap, when reshaped, the optical module 720 and, optionally, the frame 710. In another embodiment, the plurality of pins may be integrally formed with the frame. Additionally or alternatively, the plurality of pins may comprise more than one reshapable portion.

There may be one or more pins 740 per optical module 720 to achieve the assembly with the frame 710, two pins 740 per opening 711 in the embodiments of FIGS. 13 and 14. When providing the plurality of optical modules 720 to the plurality of openings 711, each of the reshapable portions 741 of the pins may, respectively, protrude from an upper surface 723*a* of the optical module and an upper surface 712*a* of the frame, and protrude from a bottom surface 723*b* of the optical module and a bottom surface 712*b* of the frame.

For each opening 711 and optical module 720 paired, at least one recess 724 may be provided to the optical module 720 and/or to a surface adjacent to the opening 711, said at least one recess 724 being configured for receiving a portion of the pin 740. In the embodiments of FIGS. 13 and 14, the at least one recess 724 is provided to a side surface of the optical module 720; more particularly two recesses 724 located in diametrical opposition are provided to each side of the optical module 720.

To reshape the plurality of pins 740, a tool with a heated head may be applied on each reshapable portion 741. The shape of the heated head may define the reshaped form of the pin 740. Indeed, under the application of heat and/or pressure, the reshapable portion 741 will complement the shape of the reshaping head applied to it. In an embodiment, the reshaping head may comprise a semi-spherical cavity and the reshapable portion 741 will be reshaped as a semi-sphere. In another embodiment, the reshaping head may comprise an elongated cavity and the reshapable portion 741 will be reshaped accordingly.

Preferably, the reshaped form of the pin 740 extends along and/or across the periphery of the optical module 720. During assembly, the heated head may be configured to apply heat at a temperature above the glass transition temperature of the reshapable portion 741. More than one reshapable portion 741 may be reshaped at once by the tool. For example, the tool may reshape at once two adjacent pins 740. In the embodiments of FIGS. 13 and 14, the tool may be configured for reshaping five pairs of adjacent pins 740 organized in one column at once.

FIG. 14 is a schematic exploded perspective view of a lighting system similar to the exemplary embodiment of FIG. 13 according to the present invention. The lighting system 1500 comprises the supporting substrate 550 and the optical assembly 700. The optical assembly 700 comprises: the frame 710, the plurality of optical modules 720, the support means 731, 732, and the plurality of pins 740. The optical assembly 700 comprises the plurality of optical modules 720 arranged in an array, an array of five rows by four columns in the present embodiment. Each of the plurality of optical modules 720 is similar to the optical modules 720 of FIG. 13.

In the embodiment of FIG. 14, the plurality of light sources 555 is arranged on the supporting substrate 550, each of the plurality of light sources 555 corresponding to one optical module 720 of the plurality of optical modules. The plurality of light sources 555 may be provided to a PCB and the supporting substrate 50 may comprise a heat sink (not shown) in thermal contact with the PCB.

To assemble the optical assembly 1500, the frame 710 may be provided upside down to an assembly line. An upside face of the frame 710 may correspond to a face in a direction opposite to a plurality of light sources 555 when the optical module 720 is assembled to the frame 710. The plurality of optical modules 720 may then be provided to the frame 710, followed by the plurality of pins 740 through the recesses 724 of each optical module. The plurality of pins 740 may be inserted in the recesses 724 by force. After inserting the plurality of pins 740, both ends of each pin 740 may protrude from, respectively the top face of the frame 710 and the bottom face of the frame 710. In the embodiment of FIG. 14, the end of the pin opposite the plurality of light sources 555 is the reshapable portion 741 of the pin. In another embodiment, both ends may be reshapable portions of the pin.

These reshapable portions 741 may be reshaped under the application of heat and/or pressure by a specific tool. Depending on embodiments, a plurality of reshapable portions 741 may be reshaped simultaneously. For example, both reshapable portions of a pin comprising two reshapable ends may be reshaped simultaneously. In another embodiment, a plurality of reshapable portions 741 protruding from one side of the frame 710 is reshaped simultaneously.

After assembly of the optical assembly 1500, the optical assembly 1500 may be provided to the supporting substrate 50, and the optical assembly and the supporting substrate 550 may be fixed together using the fixation means 714 passing through the through-hole 713 of the frame. When providing the optical assembly 1500 to the supporting substrate 550, the frame 710 may be positioned in a preset position using a positioning protrusion 715 as can be seen in FIG. 15B configured for cooperating with a corresponding positioning indent 715' of the supporting substrate as can be seen in FIG. 14.

Figure 17:
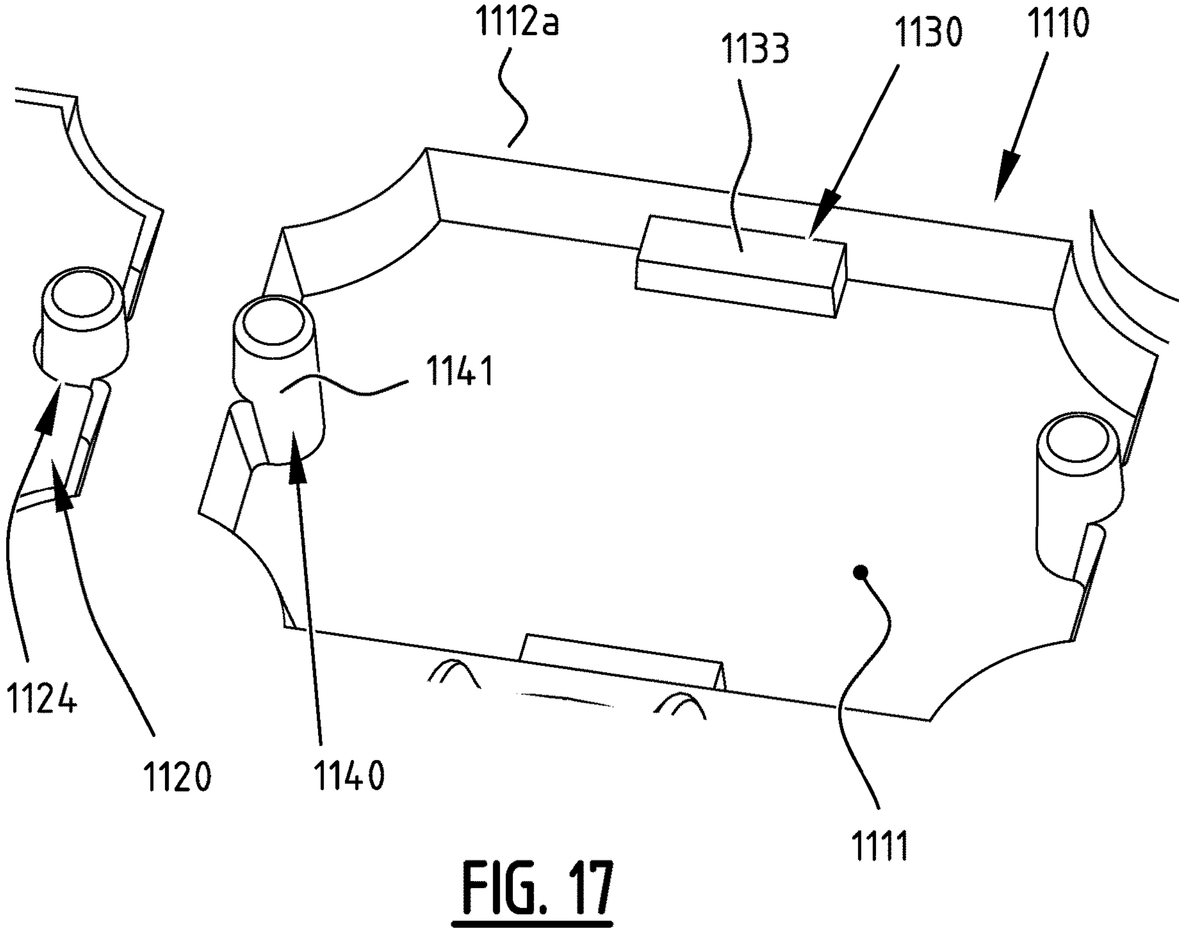
FIG. 17 is a partially cut perspective view of the frame according to another exemplary embodiment.

FIG. 17 is a partially cut perspective view of the frame according to another exemplary embodiment of the present invention.

A frame 1110 may comprises at least one opening 1111, a plurality of openings 1111 in the embodiment of FIG. 17. A plurality of pins 1140 comprises each a portion 1141 configured for being plastically reshaped under an application of heat and/or pressure to assemble a plurality of optical modules 1120 to the frame 1110. The reshapable portion 1141 may be located at one end of the pin 1140. The plurality of pins 1140 may be arranged at the periphery of optical modules such that, when reshaped, the reshapable portion 1141 of the pin overlaps the optical module and, optionally, the frame 1110 optical module. In the embodiment of FIG. 17 the plurality of pins 1140 is integrally formed with the frame 1110 and each of the pins 1140 is extending upwardly away from the frame 1110. There may be one or more pins 1140 per optical module to achieve the assembly with the frame 1110, two pins 1140 per opening 1111 in the embodiment of FIG. 17. To accommodate the plurality of pins 1140, the optical module may comprise at least one corresponding recess 1124. The at least one recess 1124 may be provided to a side surface of the optical module 1120; there are two recesses 1124 diametrically located for each optical module 1120 of FIG. 17.

When providing the plurality of optical modules to the plurality of openings 1111, each of the reshapable portions 1141 of the pins may protrude from an upper surface 1112*a* of the frame. A support means 1130 of FIG. 17 may comprise at least one tab, a plurality of tabs 1133 in FIG. 17, extending substantially parallel to a plane of the opening 1111 of the frame. The plurality of tabs 1133 may extend inwardly inside the opening 1111. Each of the plurality of pins 1140, when the optical module 1120 is assembled to the frame, may be located at substantially 90° with respect to the support means 1130 as seen in the plane of the opening 1111. In the embodiment of FIG. 17, there may be two tabs 1133 in diametrical opposition of one another and two pins 1140 in diametrical opposition of one another per opening 1111, and the plurality of pins 1140 is aligned in a direction at substantially 90° with respect to an alignment of the plurality of tabs 1133. By extending inwardly, the plurality of tabs 1133 may prevent the optical module 1120 to fall through the corresponding opening 1111. More particularly, the tabs 1133 may extend in prolongation of a bottom surface of the frame 1110.

In an embodiment, the plurality of optical modules 1120 may comprise at least one indent complementary to the at least one tab 1133 of the frame. The complementary indent may be configure such that, when the optical module is assembled to the frame, a first bottom surface of the optical module is substantially at a same level as a second bottom surface of the frame, said first bottom surfaces and second bottom surface being adapted for facing a plurality of light sources. In another embodiment, the plurality of optical modules 1120 may not comprise the at least one complementary indent.

Figure 18:
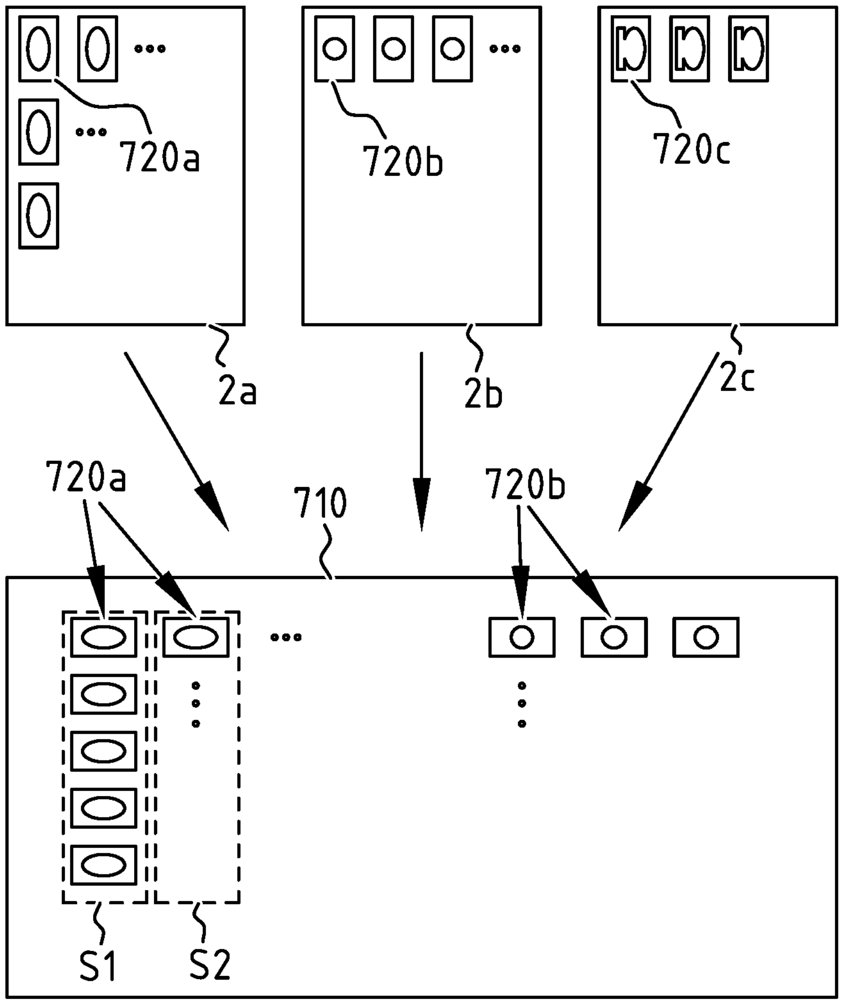
FIG. 18 illustrates the selecting of optical modules in accordance with an embodiment of the method.
Figure 19:
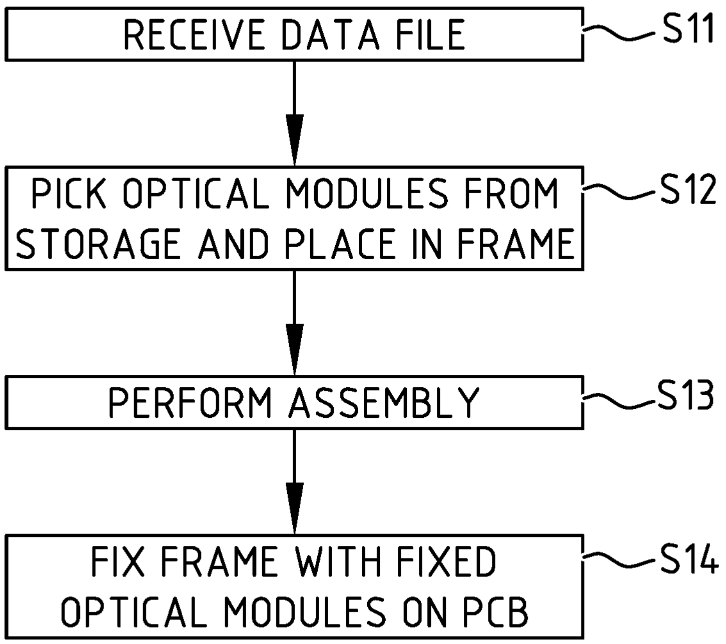
FIG. 19 illustrates a flow chart of an exemplary embodiment of a method for assembling optical modules.

FIGS. 18 and 19 illustrate schematically an exemplary embodiment of a method for assembling optical modules 720*a*, 720*b*, 720*c*. As illustrated in FIG. 19, the method comprises the following steps. In a first step S11 digital data representative for the optical modules to be included in the frame is received. In a second step S12, based on the received digital data in step S11, the plurality of optical modules is selected from a storage 2*a*, 2*b*, 2*c* comprising multiple different optical modules 720*a*, 720*b*, 720*c*, and placed in a frame 710 with a plurality of openings 711, see also FIG. 19. This picking and placing may be done automatically using a robotic arm controlled by a computing means based on the received digital data, but could also be done partially manually. The plurality of optical modules 720*a*, 720*b*, 720*c* is provided to the frame 710 such that each optical module of the plurality of optical modules is provided to a corresponding opening 711 of the plurality of openings 711. In the embodiment of FIG. 19, each opening 711 is provided with one optical module 720, but one could also have an opening 711 with a size which is a multiple of the size of the optical module 720*a*, 720*b*, 720*c* so that multiple optical modules can be arranged in a single opening 711. In a third step S13, the reshaping for locking the plurality optical modules between the support means and the plurality of reshaped pins is performed. As explained above, the reshaping may be achieved by a tool with a reshaping head. The reshaping head of the tool may be configured for applying heat and/or pressure and may be designed to reshape the reshapable portion of the pin following a preset form. Indeed, under the application of heat and/or pressure, the reshapable portion will complement the shape of the reshaping head applied to it. In an embodiment, the reshaping head may comprise a semi-spherical cavity and the reshapable portion will be reshaped as a semi-sphere. In another embodiment, the reshaping head may comprise an elongated cavity and the reshapable portion will be reshaped accordingly. The reshaping may consist in reshaping to lock in place one or more subsets S1, S2 of optical modules 720*a*, 720*b*, 720*c* simultaneously using one or more reshaping heads. For example a first subset S1 may be locked thanks to a first reshaping head and a second subset S2 may be locked simultaneously thanks to a second reshaping head. The subsets S1, S2 are shown to be columns in FIG. 19 but can be any group of optical modules, e.g. arrays of 2×2 optical modules or rows of optical modules, or arrays of 2×1 or 2×3 optical modules, etc.

Whilst the principles of the invention have been set out above in connection with specific embodiments, it is to be understood that this description is merely made by way of example and not as a limitation of the scope of protection which is determined by the appended claims.

The invention claimed is:

1. A method for assembling optical modules, said method comprising the steps of:

providing a frame with at least one opening;

providing a plurality of optical modules to the frame, each optical module of the plurality of optical modules being provided to an opening of the at least one opening;

providing a support means to each of the plurality of optical modules and/or to each of the at least one opening, said support means being configured for supporting the optical module at least partially within the opening of the frame; and assembling the plurality of optical modules to the frame by plastically reshaping a material portion in contact with the frame and the optical module, the plastic reshaping occurring under an application of heat and/or pressure;

wherein the assembling comprises ultrasonic welding the plurality of optical modules to the frame;

wherein the optical module and the frame are welded along joining surfaces, and wherein at least one surface of the joining surfaces is provided with an energy director configured to concentrate ultrasonic energy and to initiate melting during the welding; and wherein, when the optical module is assembled to the frame, a first bottom surface of the optical module is substantially at a same level as a second bottom surface of the frame, said first bottom surface and second bottom surface being adapted for being arranged on a support, said support carrying a plurality of light sources.

2. The method according to claim 1, wherein the assembling comprises plastically reshaping a plurality of pins, each pin of the plurality of pins comprising a portion configured for being plastically reshaped under an application of heat and/or pressure to lock the plurality of optical modules between the support means and the reshaped portions of the plurality of pins.

3. The method according to claim 1, wherein the providing of the plurality of optical modules to the frame comprises the step of receiving digital data representative for the optical modules to be included in the frame, and the step of, based on the received digital data, selecting the plurality of optical modules from a storage comprising multiple different optical modules.

4. The method according to claim 1, wherein each optical module of the plurality of optical modules has a flat bottom surface, and wherein the welding comprises welding a contact surface of a peripheral edge portion of the optical module to a contact surface of the frame.

5. The method according to claim 1, wherein the welding is ultrasonic welding, and wherein the optical module and the frame are welded along joining surfaces which form shear joints.

6. The method according to claim 1, wherein the welding is done by laser beam welding, and wherein, for each optical module, one of the optical module or a connection portion of the frame adjacent the opening comprises a transparent portion, and the other one of the optical module and the connection portion comprises an opaque portion, said transparent portion and opaque portion being overlapped when the optical module is provided to the frame as seen in a direction substantially perpendicular to a plane of the opening; wherein the welding comprises using a beam to weld, for each optical module, the transparent portion to the opaque portion.

7. The method according to claim 1, wherein multiple optical modules are welded simultaneously.

8. The method according to claim 1, wherein the at least one opening describes an array of at least two rows and two columns, and wherein the welding comprises welding four adjacent optical modules using a single circular motion of the laser beam.

9. The method according to claim 2, wherein, when assembling the plurality of optical modules to the frame, a pin of the plurality of pins is plastically reshaped over at least two of the plurality of optical modules.

10. An optical assembly comprising:
- a frame with at least one opening;
- a plurality of optical modules, each optical module of the plurality of optical modules being provided to an opening of the at least one opening; and
- a support means provided to each of the plurality of optical modules and/or to each of the at least one opening, said support means being configured for supporting the optical module at least partially within the opening of the frame;
- wherein each optical module is assembled to the frame by plastically reshaping a material portion in contact with the frame and the optical module, the plastic reshaping occurring under an application of heat and/or pressure;
- wherein, when the optical module is assembled to the frame, a first bottom surface of the optical module is substantially at a same level as a second bottom surface of the frame, said first bottom surface and second bottom surface being adapted for facing and being arranged on a support, said support carrying a plurality of light sources; and
- wherein each opening in the frame is delimited by a peripheral wall with at least one protruding portion of the support means configured for supporting at least one peripheral portion of the optical module.

11. The optical assembly according to claim 10, further comprising a plurality of pins comprising a portion configured for being plastically reshaped under an application of heat and/or pressure to assemble the plurality of optical modules to the frame to lock the plurality of optical modules between the support means and the reshaped portions of the plurality of pins.

12. The optical assembly according to claim 10, wherein the plurality of optical modules comprises four adjacent optical modules provided to four adjacent openings of the at least one opening, wherein a portion of the frame surrounded by the four adjacent openings is provided with a hole or a recess or a protrusion.

13. The optical assembly according to claim 10, wherein each opening has substantially the shape of a rectangle with cut-off corners.

14. The optical assembly according to claim 10, further comprising a support carrying a plurality of light sources, wherein the frame with the plurality of optical modules is arranged on the support so that each optical module is associated with one or more light sources of the plurality of light sources.

15. The optical assembly according to claim 11, wherein, for each opening and optical module paired, at least one recess is provided to the optical module and/or to a surface adjacent to the opening, said at least one recess being configured for receiving a portion of the pin.

16. The optical assembly according to claim 10, wherein the support means comprises at least one tab extending substantially parallel to a plane of the at least one opening of the frame.

17. The optical assembly according to claim 11, wherein the reshapable portion of the pin is protruding outwardly when the optical module is provided to the opening.

18. A method for assembling optical modules, said method comprising the steps of:
- providing a frame with at least one opening;
- providing a plurality of optical modules to the frame, each optical module of the plurality of optical modules being provided to an opening of the at least one opening;
- providing a support means to each of the plurality of optical modules and/or to each of the at least one opening, said support means being configured for supporting the optical module at least partially within the opening of the frame; and
- assembling the plurality of optical modules to the frame by plastically reshaping a material portion in contact with the frame and the optical module, the plastic reshaping occurring under an application of heat and/or pressure;
- wherein the assembling comprises ultrasonic welding the plurality of optical modules to the frame;
- wherein the optical module and the frame are welded along joining surfaces which form shear joints; and
- wherein, when the optical module is assembled to the frame, a first bottom surface of the optical module is substantially at a same level as a second bottom surface of the frame, said first bottom surface and second bottom surface being adapted for being arranged on a support, said support carrying a plurality of light sources.

* * * * *